United States Patent
Iyer et al.

(10) Patent No.: US 11,238,391 B2
(45) Date of Patent: Feb. 1, 2022

(54) PREDICTION OF BUSINESS OUTCOMES BY ANALYZING RESUMES OF USERS

(71) Applicants: Ganesh Iyer, San Jose, CA (US); Roman Samarev, San Jose, CA (US)

(72) Inventors: Ganesh Iyer, San Jose, CA (US); Roman Samarev, San Jose, CA (US)

(73) Assignee: DOTIN INC., San Jose, CA (US)

( * ) Notice: Subject to any disclaimer, the term of this patent is extended or adjusted under 35 U.S.C. 154(b) by 85 days.

(21) Appl. No.: 16/394,586

(22) Filed: Apr. 25, 2019

(65) Prior Publication Data
US 2020/0342384 A1   Oct. 29, 2020

(51) Int. Cl.
*G06Q 10/06*   (2012.01)
*G06Q 10/10*   (2012.01)

(52) U.S. Cl.
CPC ... *G06Q 10/06375* (2013.01); *G06Q 10/1053* (2013.01)

(58) Field of Classification Search
USPC .......................................................... 705/7.37
See application file for complete search history.

(56) References Cited

U.S. PATENT DOCUMENTS

| | | | |
|---|---|---|---|
| 2002/0042786 A1* | 4/2002 | Scarborough | G06Q 10/10 706/21 |
| 2009/0094090 A1* | 4/2009 | Dow | G06Q 10/06 705/7.14 |
| 2009/0276231 A1* | 11/2009 | Bazigos | G06Q 10/105 705/320 |
| 2020/0184425 A1* | 6/2020 | Mondal | G06Q 10/1053 |
| 2021/0073737 A1* | 3/2021 | Flynn | G06Q 10/1053 |

* cited by examiner

*Primary Examiner* — Folashade Anderson
(74) *Attorney, Agent, or Firm* — Chip Law Group

(57) ABSTRACT

Predicting business outcomes for a target user includes generation of predictor models based on test data of tests users. The test data includes historical data of the test users, resumes of the test users, and answers provided by the test users to psychometric questions. The predictor models are then used to predict psychometric features and business outcomes based on target data of the target user. The target data includes a resume of the target user, historical data of the target user, and answers provided by the target user to the psychometric questions.

20 Claims, 13 Drawing Sheets

RESUME

Name: John Doe — 804

Positions held:

Lead web developer
    Company: ABC Inc.
    Experience: 2 years
    Responsibilities:

Senior web developer
    Company: ABC Inc.
    Experience: 2 years
    Responsibilities:

Associate web developer
    Company: XYZ technologies ltd.
    Experience: 2 years
    Responsibilities:

— 806

Qualification: Bachelor of Science (Computer Science) from PQR University — 808

Skills: C, C++, HTML, CSS, Ruby on rails, JavaScript — 810

Awards: ABCDE award for.........
       EFGHI award for.......... — 812

Hobbies: Skiing, dancing, and gaming — 814

PREDICTION OF BUSINESS OUTCOMES BY ANALYZING RESUMES OF USERS

FIELD

Various embodiments of the disclosure relate generally to business enhancement using machine learning. More specifically, various embodiments of the disclosure relate to prediction of business outcomes by analyzing resumes of users.

BACKGROUND

There are always risks associated with initiating new endeavors, especially in a business. The severity of these risks, however, may be substantially minimized if potential outcomes, both positive and negative, are predicted. For an individual, it may include getting suggestion for a suitable job profile, while for an organization, such as an e-commerce service provider, it may include identifying purchase behavior of customers to suitably adjust their inventory for targeting more customers. Likewise, for increasing work productivity of employees, a business organization may determine job affinity of the employees and accordingly allocate different work profiles and tasks to the employees.

Psychometric analyses, further, plays an important role in identifying potential business outcomes for users and organizations. The conventional ways of psychometric analyses involve interviewing with psychologists, counselors, or therapists who observe conscious, subconscious, and semi-conscious behavior of their interviewees. Such, interviews may be subject to personal judgement and bias of an interviewer. For example, different interviewers have different judgment capabilities. Hence, it is impractical to solely rely on the judgment of the interviewers for accurate and precise prediction results. Moreover, it may not be feasible to manually conduct psychometric analyses of a large number of users; for example, employees in an organization. Another known technique of conducting psychometric analyses involves analyzing psychosocial reactions of users to tests that stimulate artificially created situations, such as Thematic Apperception Test (TAT), Word Association Test (WAT), and the like. However, such tests fail to consider recent activities and behavioural changes of the users for psychometric analyses, thus making the results of psychometric analyses less accurate, which in turn results in identification of inaccurate business outcomes.

In light of the foregoing, there exists a need for a solution that overcomes the aforementioned problems and provides accurate business outcomes.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

Prediction of business outcomes by analyzing resumes of users is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

BRIEF DESCRIPTION OF THE DRAWINGS

FIG. 8 is a block diagram that illustrates a resume of a test user of FIG. 1, in accordance with an exemplary embodiment of the disclosure;

DETAILED DESCRIPTION

Figure 1:
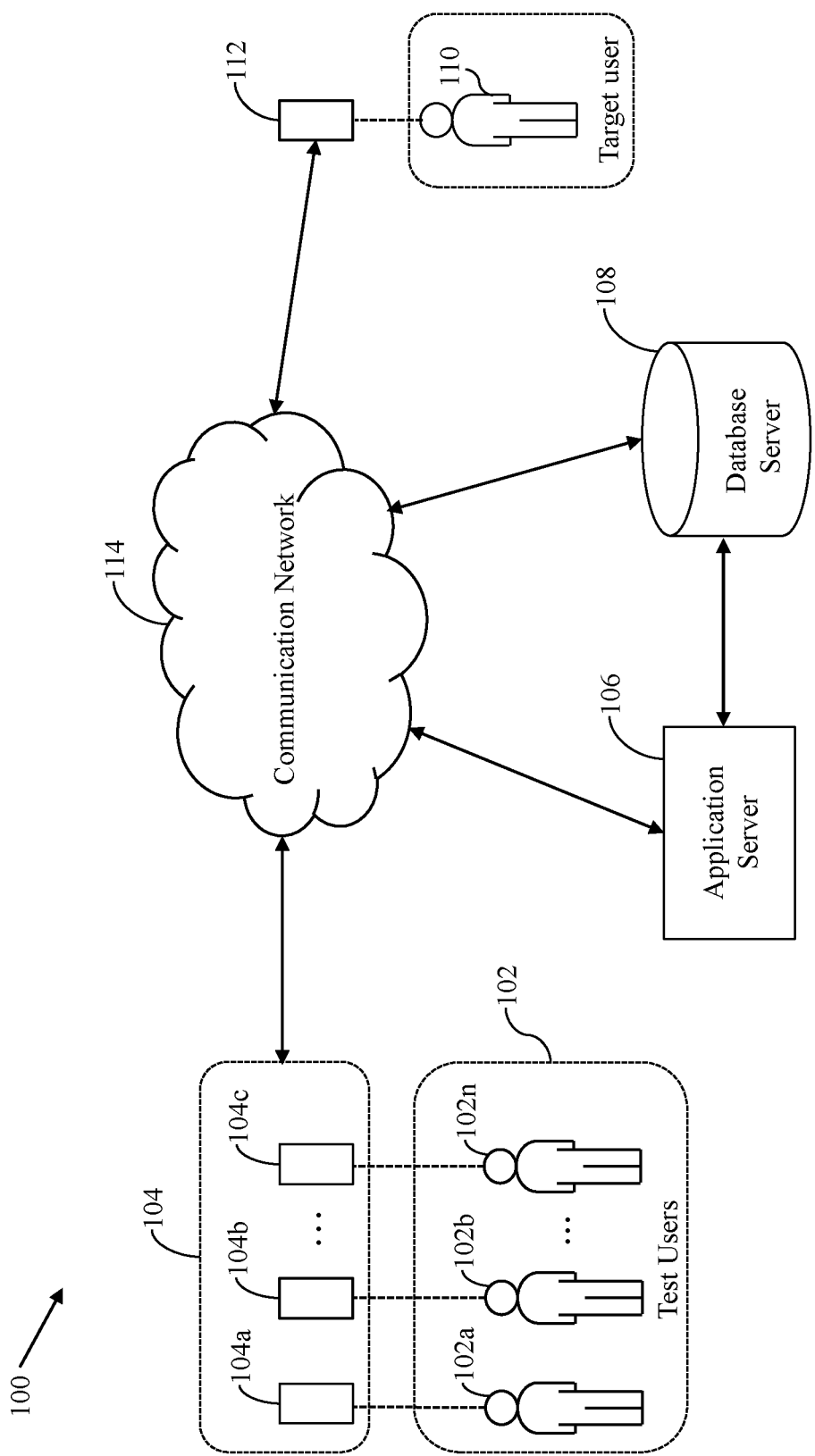
FIG. 1 is a block diagram that illustrates an exemplary environment for prediction of business outcomes by analyzing resumes of users, in accordance with an exemplary embodiment of the disclosure.

Certain embodiments of the disclosure may be found in a disclosed apparatus for predicting business outcomes by analyzing a resume of a target user. Exemplary aspects of the disclosure provide methods and systems for predicting business outcomes for target users. The method includes retrieving, by a server, historical data of at least one test user, a first resume associated with the test user, and a first set of answers provided by the test user to a set of psychometric questions. The first set of answers and the first resume are analyzed by the server. The server may be configured to analyze the first set of answers for deriving one or more psychometric features of the test user. The server may be configured to analyze the first resume for extracting first text data corresponding to a set of features from the first resume. One or more predictor models are generated by the server based on the historical data of the test user, the first text data, and the one or more psychometric features of the test user. One or more business outcomes for the target user are predicted by the server based on the one or more predictor models and a second resume associated with the target user.

Another embodiment provides the system for predicting business outcomes for a target user. The system includes a server that may be configured to retrieve historical data of at least one test user, a first resume associated with the test user, and a first set of answers provided by the test user to a set of psychometric questions. The server may be configured to analyze the first set of answers and the first resume. The first set of answers is analyzed for deriving one or more psychometric features of the test user. The first resume is analyzed for extracting first text data corresponding to a set of features from the first resume. The server may be configured to generate one or more predictor models based on the historical data of the test user, the first text data, and the one or more psychometric features of the test user. The server may be configured to predict one or more business outcomes for the target user based on the one or more predictor models and a second resume associated with the target user.

The disclosure involves the prediction of business outcomes by analyzing resumes of test users and answers provided by the test users to psychometric questions. A resume of each test user reflects their skills, experiences, and goals and the answers provided by the test users to the psychometric questions allow recruiters to gain insights into the subconscious minds of the test users. As the subconscious mind is responsible for a majority of decision-making tasks and is directly related to an individual's psychometric orientation, the disclosure yields more accurate results in comparison to related techniques. In one exemplary scenario, the predicted business outcomes may be used by an organization for improving marketing strategies and in turn expanding business. For example, the organization may target a specific group of customers that have high purchase affinity for advertising a product launched by the organization. In another exemplary scenario, the predicted business outcomes may be used by an organization to improve resource management. For example, electronic commerce (e-commerce) industries may use the predicted business outcomes (such as, predicted purchase trend) to manage their inventory. Likewise, airline industry may use the predicted business outcomes (such as, predicted travel trend) to customize ticket prices to attract more customers.

FIG. 1 is a block diagram that illustrates an exemplary environment 100 for prediction of business outcomes by analyzing resumes of users, in accordance with an exemplary embodiment of the disclosure. The environment 100 includes test users 102a-102n (hereinafter, designated and referred to as "the test users 102"), test-user devices 104a-104n (hereinafter, designated and referred to as "the test-user devices 104"), an application server 106, and a database server 108. The environment 100 further includes a target user 110 and a target-user device 112. The test-user devices 104, the application server 106, the database server 108, and the target-user device 112 may communicate with each other by way of a communication network 114 or any other communication means established therebetween.

The test users 102 are individuals, whose test data may be used by the application server 106 for generating predictor models that predict business outcomes. The test data of each test user 102 may include historical data of the corresponding test user 102, a resume of the corresponding test user 102, and answers provided by the corresponding test user 102 to various psychometric questions. Hereinafter, the resumes of the test users 102 are referred to as 'test resumes'. The historical data of the test users 102 may refer to data collected based on past events pertaining to the test users 102. The historical data may include data generated either manually or automatically by the test users 102. For example, the historical data of the test user 102a may include, but is not limited to, curriculum information, education particulars, travel history, employment details, and purchase history of the test user 102a. The historical data of the test user 102a may further include an activity log of the test user 102a on the Internet and various social media platforms. The answers to the psychometric questions may be provided by the test user 102a when the psychometric questions are presented to the test user 102a through various online tests (such as, but not limited to, the multiple intelligence quiz, the BIG 5, or the personal globe inventory) on the test-user device 104a. The test resume of the test user 102a may correspond to a resume, a curriculum vitae, or a job application of the test user 102a. The test resume of the test user 102a may include text data that is indicative of various job positions held (currently or in the past) by the test user 102a, hobbies of the test user 102a, educational qualifications of the test user 102a, skills possessed by the test users 102, various awards won by the test user 102a, and various achievements of the test user 102a, or the like.

The test-user devices 104 may include suitable logic, circuitry, interfaces, and/or code, executable by the circuitry, that may be configured to perform one or more operations for providing the test data of the test users 102 to the application server 106. In one exemplary scenario, the test-user devices 104 may refer to communication devices of the test users 102. The test-user devices 104 may be configured to allow the test users 102 to communicate with the application server 106 and the database server 108. The test-user devices 104 may be configured to serve as an interface for providing the test data of the test users 102 to the application server 106. In one embodiment, the test-user device 104a may be configured to run or execute a software application (e.g., a mobile application or a web application), which may be hosted by the application server 106, for presenting various psychometric questions to the test user 102a for answering. The test-user device 104a may be configured to communicate the answers provided by the test user 102a to the psychometric questions to the application server 106. The test-user device 104a may be further configured to run or execute the software application for accessing the test resume of the test user 102a stored in a memory of the test-user device 104a. Based on the consent of the test user 102a, the test-user device 104a may be configured to communicate the test resume of the test user 102a to the application server 106. The test-user device 104a may be further configured to access, with the consent of the test user 102a, a social media profile of the test user 102a for retrieving the historical data of the test user 102a. Examples of the test-user devices 104 may include, but are not limited to, mobile phones, smartphones, laptops, tablets, phablets, or other devices capable of communicating via the communication network 114.

The application server 106 may include suitable logic, circuitry, interfaces, and/or code, executable by the circuitry, that may be configured to perform one or more operations for predicting business outcomes. The application server 106 may be a physical or cloud data processing system on which a server program runs. The application server 106 may be implemented in hardware or software, or a combination thereof. The application server 106 may be configured to host the software application which may be accessible on the Internet for providing a personality and business outcomes prediction service. The application server 106 may be configured to utilize the software application for retrieving the test data of the test users 102. The application server 106 may be further configured to use a tracker or a web crawler to track the activities of the test users 102 on the Internet and the social media platforms for retrieving the test data.

The application server 106 may be configured to implement a learning phase based on the test data for generating the predictor models. The predictor models may be statistical predictive models generated by means of machine learning algorithms. Examples of the algorithms used for generating the predictor models may include, but are not limited to, a Support Vector Machine (SVM), a Logistic Regression model, a Bayesian Classifier model, a Decision Tree Classifier, a Copula-based Classifier, a K-Nearest Neighbors (KNN) Classifier, a Random Forest (RF) Classifier, or Artificial neural networks.

After the generation of the predictor models, the application server 106 may be configured to implement a prediction phase in which the predictor models are used to predict the business outcomes based on various inputs received from the target user 110 (hereinafter, the inputs received from the target user 110 are designated and referred to as "target data"). In one embodiment, the business outcomes may include employment suggestions, compatibility match, product purchase affinity, color affinity, work affinity, music suggestions, and/or the like. In another embodiment, the business outcomes may include work affinity of employees, inventory suggestions, travel trend, purchase trend, and/or the like.

The application server 106 may be realized through various web-based technologies, such as, but not limited to, a Java web-framework, a .NET framework, a PHP framework, or any other web-application framework. Examples of the application server 106 may include, but are not limited to, computers, laptops, mini-computers, mainframe computers, mobile phones, tablets, and any non-transient and tangible machines that may execute a machine-readable code, a cloud-based server, or a network of computer systems. Various functional elements of the application server 106 have been described in detail in conjunction with FIG. 2. Generation of the predictor models is described later in FIG. 3.

The database server 108 may include suitable logic, circuitry, interfaces, and/or code, executable by the circuitry, that may be configured to perform one or more operations for managing and storing various forms of data. The database server 108 may be configured to store data, such as the test data retrieved from the test users 102, the target data retrieved from the target user 110, and the predictor models generated by the application server 106. The database server 108 may be configured to receive a query from the application server 106 to extract the data stored in the database server 108. Based on the received query, the database server 108 may be configured to provide the requested data to the application server 106 over the communication network 114. Examples of the database server 108 may include, but are not limited to, MySQL® and Oracle®.

The target user 110 may be an individual, whose target data may be used as input to the predictor models for predicting business outcomes. In one exemplary scenario, the target user 110 may be an individual interested in determining a compatibility match or an individual seeking suggestion regarding employment. In another exemplary scenario, the target user 110 may be a representative of an organization who wants to know future business outcomes pertaining to a new policy implementation. In another exemplary scenario, the target user 110 may be an employee of the organization, whose employment affinity (i.e., a business outcome) is of interest to the organization. In another exemplary scenario, the target user 110 may be a customer whose purchase behavior is of interest to a business industry, such as an e-commerce industry. The target data may consist of a resume of the target user 110 (hereinafter, the resume of the target user 110 is referred to as 'target resume'), answers provided by the target user 110 to the psychometric questions, and/or historical data of the target user 110. The application server 106 may be configured to obtain the target data in a manner that is similar to obtaining the test data of the test users 102.

The target-user device 112 may include suitable logic, circuitry, interfaces, and/or code, executable by the circuitry, that may be configured to perform one or more operations for providing the target data of the target user 110 to the application server 106. In one exemplary scenario, the target-user device 112 may refer to a communication device of the target user 110. The target-user device 112 may be configured to allow the target user 110 to communicate with the application server 106 and the database server 108. The target-user device 112 may be configured to provide the target data to the application server 106. In an exemplary scenario, the target-user device 112 may be configured to run or execute the software application, which is hosted by the application server 106, for presenting various psychometric questions to the target user 110 for answering. The target-user device 112 may be configured to communicate the answers provided by the target user 110 to the application server 106. The target-user device 112 may be configured to retrieve the historical data of the target user 110 by accessing the social media profile of the target user 110 based on a consent of the target user 110 and provide the retrieved historical data to the application server 106. The target-user device 112 may be further configured to run or execute the software application that may retrieve the target resume of the target user 110 stored in a memory of the target-user device 112. The target-user device 112 may be further configured to access, with the consent of the target user 110, a social media profile of the target user 110 for retrieving the historical data of the target user 110. Examples of the target-user device 112 may include, but are not limited to, a mobile phone, a smartphone, a laptop, a tablet, a phablet, or any other device capable of communicating via any communication network.

The communication network 114 may include suitable logic, circuitry, interfaces, and/or code, executable by the circuitry, that may be configured to transmit content and messages between various entities, such as the test-user devices 104, the application server 106, the database server 108, and/or the target-user device 112. Examples of the communication network 114 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the application server 106 may be configured to perform the prediction of the business outcomes in two phases, such as the learning and prediction phases. The learning phase may focus on generation of the predictor models. During the learning phase, the application server 106 may be configured to retrieve the test data from the test users 102. The test data may include the historical data of the test users 102, the test resumes of the test users 102, and the answers provided by the test users 102 to the psychometric questions. During the learning phase, the application server 106 may be further configured to analyze the test data for generating the predictor models. For example, the test resume of the test users 102 may be analyzed to extract first text data corresponding to a set of features, such as job title, skills, hobbies, educational qualification, strengths, weaknesses, awards, achievements, of the like. The answers provided by the test users 102 may be analyzed to derive psychometric features, such as personality attributes, of the test users 102. The psychometric features may refer to behavioral qualities or characteristics of an individual's persona. Personality attributes (such as BIG5 attributes and RIASEC Holland occupational themes) are one example of psychometric features. As per BIG5 attributes, the personality attributes may be classified into five areas of: neuroticism, openness, conscientiousness, extraversion, and agreeableness. As per RIASEC Holland occupational themes, the personality attributes may be classified into six categories: Realistic (Doers), Investigative (Thinkers), Artistic (Creators), Social (Helpers), Enterprising (Persuaders), and Conventional (Organizers). Other examples of psychometric features may include, but are not limited to, Gardener's Multiple Intelligences theory related attributes, emotional attributes, aesthetic preferences, and the like. Likewise, the historical data of each test user 102 may be normalized and filtered to remove irrelevant information. The application server 106 may be further configured to utilize the analyzed test data as input for the machine learning algorithms to generate the predictor models. The analyzed test data and the predictor models may be stored in the database server 108.

The learning phase may be followed by the prediction phase. During the prediction phase, the application server 106 may be configured to retrieve the target data of the target user 110. The target data may include the target resume of the target user 110. The target data may further include answers provided by the target user 110 to the psychometric questions and/or the historical data of the target user 110. The application server 106 may be further configured to analyze the target data for predicting the business outcomes. For example, the answers provided by the target user 110 may be analyzed to derive the psychometric features, such as personality attributes, of the target user 110 and the target resume of the target user 110 may be analyzed to extract second text data corresponding to the set of features from the target resume. In one embodiment, the application server 106 may be further configured to analyze the target resume and the historical data of the target user 110 to predict psychometric features of the target user 110. The application server 106 may be further configured to use the derived and predicted psychometric features, the extracted second text data, and/or the analyzed historical data as input to the predictor models for predicting the business outcomes. The learning phase is explained in detail in conjunction with FIG. 3 and the prediction phase is explained in detail in conjunction with FIGS. 4-7.

Figure 2:
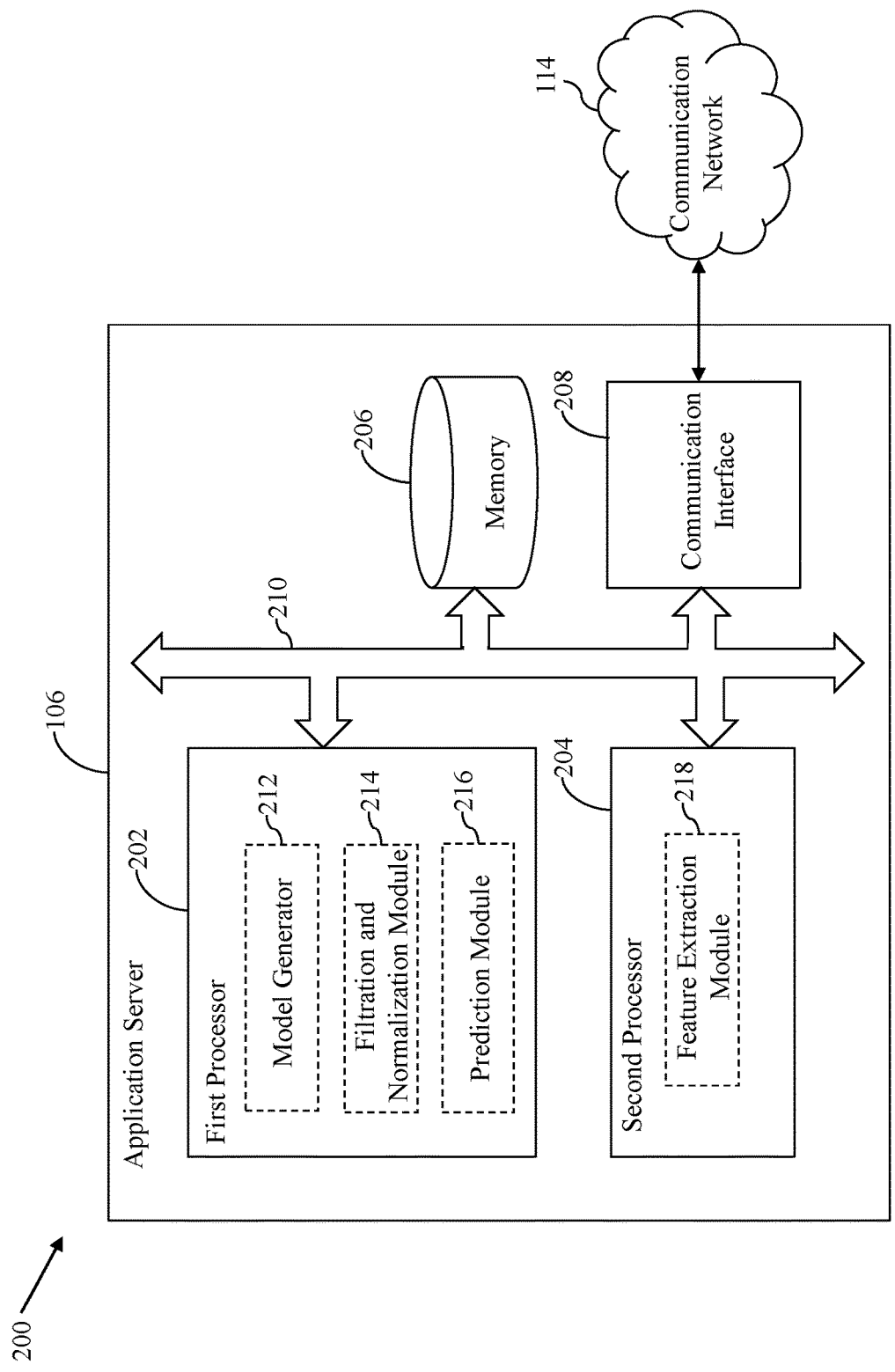
FIG. 2 is a block diagram that illustrates an application server of FIG. 1, in accordance with an exemplary embodiment of the disclosure.

FIG. 2 is a block diagram that illustrates the application server 106, in accordance with an exemplary embodiment of the disclosure. The application server 106 may include first and second processors 202 and 204, a memory 206, and a communication interface 208. The first and second processors 202 and 204, the memory 206, and the communication interface 208 may communicate with each other by means of a communication bus 210.

The first processor 202 may include suitable logic, circuitry, interfaces, and/or code, executable by the circuitry, that may be configured to perform one or more operations for implementing the learning and prediction phases. The first processor 202 may be configured to obtain the test data of the test users 102 and the target data of the target user 110. The first processor 202 may be configured to analyze the answers provided by the test users 102 and the target user 110 to the psychometric questions to derive the psychometric features for the test users 102 and the target user 110, respectively. Examples of the psychometric features may include, but are not limited to, skills and knowledge, abilities, attitudes, emotional attributes, aesthetic preferences, and personality attributes. The first processor 202 may include multiple functional blocks, such as: a model generator 212, a filtration and normalization module 214, and a prediction module 216. Examples of the first processor 202 may include, but are not limited to, an application-specific integrated circuit (ASIC) processor, a reduced instruction set computing (RISC) processor, a complex instruction set computing (CISC) processor, a field-programmable gate array (FPGA), and the like.

The second processor 204 may include suitable logic, circuitry, interfaces, and/or code, executable by the circuitry, that may be configured to execute one or more operations for the analysis of the resumes (i.e., the test resumes and the target resume). The second processor 204 may include a feature extraction module 218. The feature extraction module 218 may include suitable logic, circuitry, interfaces, and/or code, executable by the circuitry, that may be configured to extract the first text data from the test resumes and the second text data from the target resume, corresponding to the set of features. The text data extracted from the test resumes and the target resume is indicative of the set of features such as, job titles, skills, hobbies, educational qualifications, strengths, weaknesses, awards, and achievements corresponding to the test users 102 and the target user 110. Examples of the second processor 204 may include, but are not limited to, a digital signal processor (DSP), an ASIC processor, a RISC processor, a CISC processor, an FPGA, and the like.

The memory 206 may include suitable logic, circuitry, interfaces, and/or code, executable by the circuitry, that may be configured to store the instructions and/or code that enable the first and second processors 202 and 204 to execute the corresponding operations. In one embodiment, the memory 206 may be configured to store the test data, the target data, and the predictor models. Examples of the memory 206 may include, but are not limited to, a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 206 in the application server 106, as described herein. In another embodiment, the memory 206 may be realized in form of a cloud storage working in conjunction with the application server 106, without departing from the scope of the disclosure.

The communication interface 208 may include suitable logic, circuitry, interfaces, and/or code, executable by the circuitry, that may be configured to transmit and receive data to (or form) various entities, such as the test-user devices 104, the target-user device 112, and/or the database server 108 over the communication network 114. Examples of the communication interface 208 may include, but are not limited to, an antenna, a radio frequency transceiver, a wireless transceiver, a Bluetooth transceiver, an Ethernet port, a universal serial bus (USB) port, or any other device configured to transmit and receive data. The communication interface 208 may be configured to communicate with the test-user devices 104, the target-user device 112, and the database server 108 using various wired and wireless communication protocols, such as TCP/IP, UDP, LTE communication protocols, or any combination thereof.

The model generator 212 and the filtration and normalization module 214 may include suitable logic, circuitry, interfaces, and/or code, executable by the circuitry, that may be configured to implement the learning phase for generating the predictor models. During the learning phase, the test data may be received and analyzed. For example, the model generator 212 may be configured to analyze the answers provided by the test users 102 for deriving the psychometric features of the test users 102, the filtration and normalization module 214 may be configured to analyze the historical data of the test users 102, and the feature extraction module 218 may be configured to extract the first text data corresponding to the set of features from the test resumes of the test users 102. The model generator 212 may be configured to use the normalized and filtered historical data, the derived psychometric features, and the extracted first text data for generating the predictor models. For the generation of the predictor models, the model generator 212 may be configured to use various machine learning algorithms such as, but not limited to, regression based predictive learning and neural networks based predictive leaning. In one embodiment, the model generator 212 may be further configured to update the predictor models to improve a prediction accuracy of the predictor models, based on a feedback provided by the target user 110 on relevance of the predicted business outcomes.

The filtration and normalization module 214 may be configured to normalize and filter (i.e., analyze) the historical data of the test users 102. Since the historical data of the test users 102 is obtained from multiple data sources which may have different data formats, the filtration and normalization module 214 may be configured to normalize the historical data by converting the historical data to a default data format with one or more data controllable fields. The data controllable fields may include a name field, a content field, a source field, a type of data field, or the like. For example, when the historical data of the test users 102 is received from the data sources, the historical data may be in a plurality of data formats (such as Comma-separated Values (CSV) format, Tab-separated Values (TSV) format, Extensible Markup Language (XML) format). The filtration and normalization module 214 may be configured to convert the plurality of data formats into the default format, for example, a textual format having controllable fields. After normalizing the historical data of the test users 102, the filtration and normalization module 214 may be configured to filter the normalized historical data. For example, the filtration and normalization module 214 may be configured to filter the commonly used words (such as "the", "is", "at", "which", "on", and the like) as irrelevant information from the normalized historical data. In another example, the normalized historical data may be filtered to parse specific keywords such as, but not limited to, identifying a stream of numbers that may represent a mobile number, extracting keywords related to personality, job, likes, dislikes, generalization of professional skills, and the like. In another example, the normalized historical data may be further filtered for extracting one or more named entities which are related to specific objects or actions (for example, identifying full name of an institution by recognizing informal name of the institution in a post) and recognizing one or more activities which are mentioned indirectly (for example, recognizing a type of sport activity by referring a place description or a club name in a post). In another example, the historical data may be further analyzed to generate a set of related entities based on skills in the historical data, for example, Java developer as a skill may also correspond to a "programmer". Likewise, Spring Boot and Java Server Pages as skills may also correspond to "web development" and "Java developer" as skills.

The prediction module 216 may include suitable logic, circuitry, interfaces, and/or code, executable by the circuitry, that may be configured to implement the prediction phase for predicting the business outcomes by using the target data as input to the predictor models. In one embodiment, the prediction module 216 may be configured to use the predictor models to predict psychometric features of the target user 110 based on the normalized and filtered historical data and the second text extracted from the target resume of the target user 110. The predicted psychometric features may also be used for predicting the business outcomes.

Figure 3:
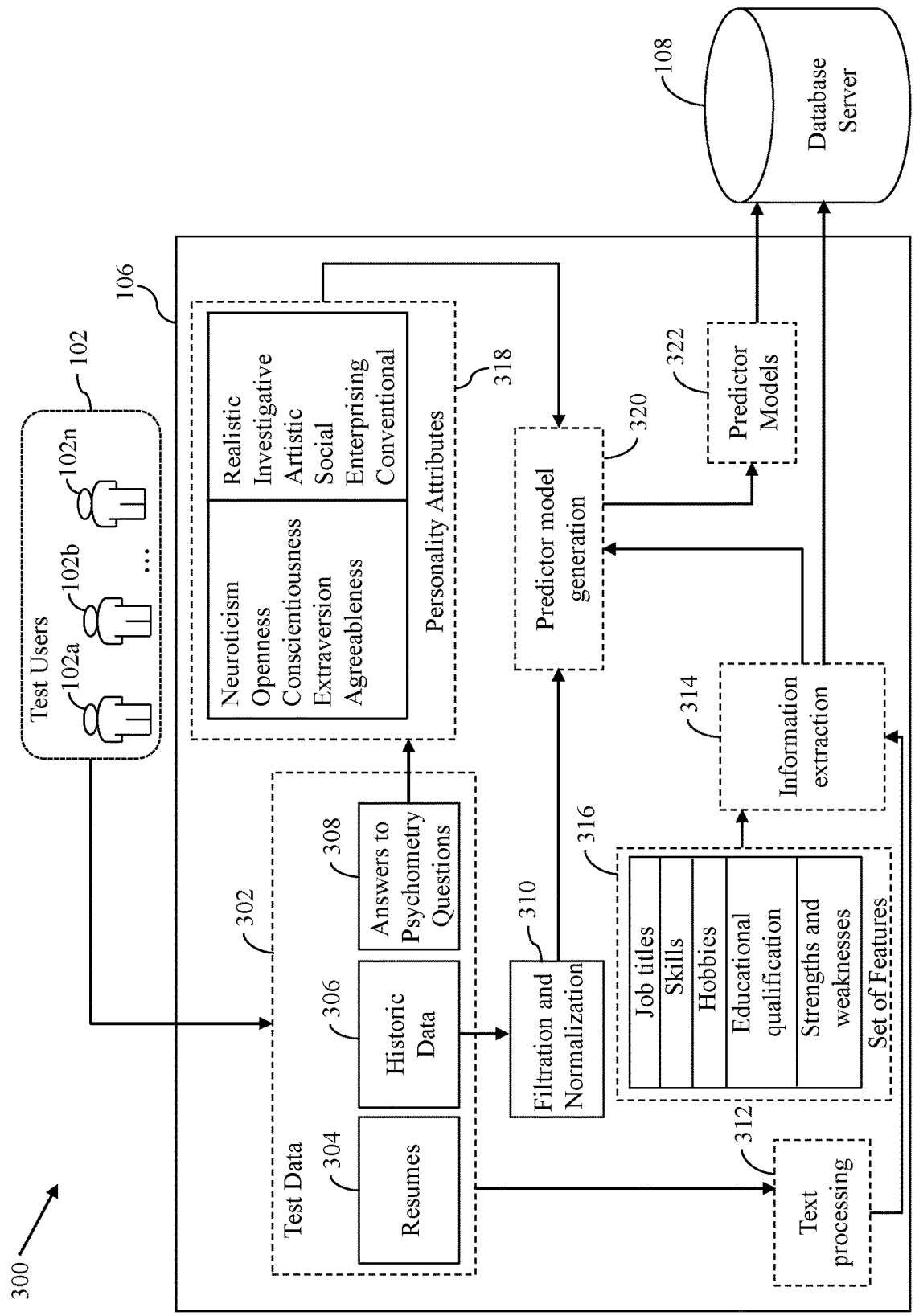
FIG. 3 is a block diagram that illustrates an exemplary scenario for generating predictor models, in accordance with an exemplary embodiment of the disclosure.

FIG. 3 is a block diagram that illustrates an exemplary scenario 300 for generating the predictor models, in accordance with an exemplary embodiment of the disclosure. The exemplary scenario 300 involves the test users 102, the application server 106, and the database server 108. The application server 106 may be configured to retrieve test data 302 of the test users 102 as a part of the learning phase. The test data 302 may include the test resumes (hereinafter, designated and referred to as 'test resumes 304') associated with the test users 102, historical data 306 of the test users 102, and answers 308 provided by the test users 102 to the psychometric questions. For the sake of brevity, the retrieval of the test data 302 is explained with respect to the test user 102a. However, it will be understood by a person of ordinary skill in the art that the application server 106 may be configured to retrieve the test data 302 of the other test users 102b-102n in a similar manner as described for the test user 102a.

With reference to the test user 102a, the test resumes 304 may include the test resume (as shown in FIG. 8) of the test user 102a. In one embodiment, the application server 106 may be configured to retrieve the test resume from the test-user device 104a of the test user 102a or from an online platform or a database, based on the consent of the test user 102a. In one embodiment, the application server 106 may be configured to utilize the software application that runs on the test-user device 104a to retrieve, with the consent of the test user 102a, the test resume stored in the memory of the test-user device 104a.

The historical data 306 of the test user 102a may include, but is not limited to, the curriculum information, the educational qualifications, the travel history, the employment details, the purchase history of the test user 102a, and one or more posts that are shared, followed, and liked by the test user 102a on the Internet and the social media platform. For example, the test-user device 104a, executing the software application hosted by the application server 106, may be configured to access the activity log of the test user 102a on the Internet to obtain the travel history and the purchase history of the test user 102a. Based on a consent of the test user 102a, the test-user device 104a may be configured to access the social media profile (for example LinkedIn®, Facebook®, or the like) of the test user 102a for retrieving the education and job particulars of the test user 102a and one or more posts that are shared, followed, and liked by the test user 102a on the social media profile. In one embodiment, the application server 106 may be configured to communicate a questionnaire to the test-user device 104a regarding the historical data 306 of the test user 102a. The test-user device 104a may be configured to communicate to the application server 106 a response provided by the test user 102a to the questionnaire and the application server 106 may be configured to the include the response of the test user 102a in the historical data 306.

The application server 106 may be further configured to prompt the test user 102a by way of the test-user device 104a to take one or more online tests (such as, but not limited to, the multiple intelligence quiz, the BIG 5, or the personal globe inventory) that include the psychometric questions. The answers 308 to the psychometric questions are then provided by the test user 102a and communicated to the application server 106 by the test-user device 104a. In one exemplary scenario, the psychometric questions may include one hundred questions, each of which is associated with a linear scale. For example, the linear scale may be scored from 0 to 9, where score '0' means there is no correlation between the test user 102a and a question statement and score '9' means the test user 102a and the question statement completely correlate. In this scenario, the answer to each psychometric question may be a score selected by the test user 102a from the linear scale. In another exemplary scenario, the psychometric questions may include hundred questions each associated with a set of options, such as four options, having a specific score associated thereto. The test user 102a may be required to select one or more options from the set of options for each psychometric question as the answer. It will be apparent to a person of skill in the art that the abovementioned examples are for illustrative purpose and should not be construed to limit the scope of the disclosure. In another embodiment, the application server 106 may be configured to retrieve the answers 308 from third-party servers (not shown) that conduct psychometric analysis of various users via online tests.

After retrieving the test data 302 of the test users 102, the application server 106 may be configured to process the test data 302. Processing of the test data 302 may involve normalizing and filtering (as represented by block 310) the historical data 306. The historical data 306 retrieved from the test users 102 may include irrelevant information. Thus, the filtration and normalization module 214 may be configured to normalize and filter the historical data 306 so that only relevant information is processed further. For example, the filtration and normalization module 214 may be configured to normalize the historical data by converting the historical data 306 to the default data format with the data controllable fields and to filter the commonly used words (such as "the", "is", "at", "which", "on", and the like) as irrelevant information from the normalized historical data 306. In another example, the filtration and normalization module 214 may be configured to parse specific keywords, such as, but not limited to, identifying a stream of numbers that may represent a mobile number, extracting keywords related to personality, job, likes, dislikes, or the like, in the normalized historical data 306. In another example, the filtration and normalization module 214 may be configured to extract one or more named entities which are related to specific objects or actions (for example, identifying full name of an institution by recognizing informal name of the institution in a post) from the normalized historical data 306 and recognize one or more activities which are mentioned indirectly (for example, recognizing a type of sport activity by referring a place description or a club name in a post) in the historical data 306.

Processing of the test data 302 may further involve analyzing the test resumes 304. For analyzing the test resumes 304, the feature extraction module 218 may be configured to process and extract text data from the test resumes 304. Text processing and information extraction is represented by blocks 312 and 314, respectively, in FIG. 3. The feature extraction module 218 may be configured to extract the first text data from the test resumes 304 by parsing the test resumes 304. The first text data extracted from each test resume 304 includes phrases and/or terms that are indicative of the set of features (as indicated by block 316). Examples of the set of features include the job titles of job positions held (currently or in past) by the corresponding test user 102, the skills of the corresponding test user 102, the hobbies of the corresponding test user 102, the education qualifications of the corresponding test user 102, the strengths and weaknesses of the corresponding test user 102, or the like. For example, the first text data extracted from the test resume of the test user 102a may include phrases and/or terms that are indicative of job titles of various job positions associated with the test user 102a, the educational qualifications of the test user 102a, the skills of the test user 102a, the awards won by the test user 102a, the hobbies of the test user 102a, and/or the strengths and weaknesses of the test user 102a. In other words, the first text data extracted from the test resume of the test user 102a includes recognition of entities and categories related to the set of features indicated by block 316. Further, based on the first text data extracted from the test resume of the test user 102a, the feature extraction module 218 may also be configured to generate a set of related entities, such as related skills. For example, if the first text data extracted from the test resume of the test user 102a includes a phrase "experience in Spring Framework with Java Server Faces", the first text data may be considered to be related to "Java Programmer" and "Web development" as skills. Further, if the first text data extracted from the test resume of the test user 102a includes a Java programming, Spring Boot, and Java Server Pages as skills, the feature extraction module 218 may relate the phrase "experience in Spring Framework with Java Server Faces" to "Java Programmer" and "Web development" with high probability. The feature extraction module 218 may be further configured to extract additional information, such as skills, of the test user 102a from various job titles listed in the test resume of the test user 102a and details (such as company activities) of the organizations with which the test user 102a has worked. The feature extraction module 218 may be configured to store the extracted first text data and the additional information in the database server 108. The database server 108, thus, may be configured to maintain a list of the test resumes that are already analyzed.

Processing of the test data 302 may further involve analyzing the answers 308 to derive psychometric features of the test users 102. For the sake of ongoing description, the psychometric features are assumed to include personality attributes 318, such as neuroticism, openness, conscientiousness, extraversion, agreeableness, realistic, investigative, artistic, social, enterprising, and conventional. The first processor 202 may be configured to analyze the answers 308 corresponding to each test user 102 for deriving the personality attributes 318 of each test user 102. In an exemplary scenario, each of the personality attributes 318 may be associated with a corresponding range of a psychometric score. For example, neuroticism may be associated with the range [42,60] for the psychometric score that varies between [0,100]. When the psychometric score has the value between 42-60, neuroticism has a confidence score of '1'. The confidence score of neuroticism may decrease as the psychometric score deviates from the corresponding range. Likewise, the other personality attributes 318 may be associated with the corresponding range of the psychometric score. When the first processor 202 receives the answers 308, the first processor 202 may be configured to determine the psychometric score for the test user 102a. In one example, when the answers 308 provided by the test user 102a include a score selected by the test user 102a from the linear scale associated with each psychometric question, the psychometric score may be equal to a cumulative sum of the scores selected by the test user 102a. In another example, when the answers 308 provided by the test user 102a include one or more options selected by the test user 102a from the set of options associated with each psychometric question, the psychometric score may be equal to a cumulative sum of the scores associated with the options selected by the test user 102a. For deriving the personality attributes 318 of the test user 102a, the first processor 202 may be configured to determine the confidence score for each personality attribute 318 based on the determined psychometric score of the test user 102a. It will be apparent to a person of skill in the art that the abovementioned exemplary scenario is for illustrative purpose and should not be construed to limit the scope of the disclosure. The first processor 202 may derive the personality attributes 318 based on the answers 308 by using by any technique known in the art.

After the test data 302 is processed, the model generator 212 may be configured to use the analyzed historical data 306, the set of features extracted from the test resumes 304, and the derived psychometric features as input for predictor model generation (as represented by block 320). The model generator 212 may be configured to use one or more machine learning algorithms, such as regression based predictive learning, neural networks based predictive leaning, and the like, for generating predictor models 322. During the generation of the predictor models 322, the model generator 212 may be configured to map features represented by the first text data (i.e., feature data extracted from the test resumes 304) and the analyzed historical data 306 with the personality attributes and generate links therebetween. In other words, a linear combination of each feature represented by the first text data is linked to each personality attribute. For example, in a linear regression model, a first job title (e.g., 'lead web developer') extracted from the test resume of the test user 102a may be mapped to the confidence scores of each of the personality attributes 318 derived for the test user 102a. Likewise, a second job title extracted from the test resume of the test user 102b may be mapped to the confidence scores of each of the personality attributes 318 derived for the test user 102b. Likewise, the analyzed historical data 306 may be mapped with the personality attributes 318. The model generator 212 may be configured to assign weights to the generated links. The assigned weights indicate the strength of association between the specific feature and the personality attributes 318. For example, for the test user 102a, the model generator 212 may assign a first weight to a first link between the first job title (e.g., 'lead web developer') and a confidence score of '0.5' for the personality attribute 'neuroticism'. In one scenario, another test user 102b may be associated with the same job title (e.g., 'lead web developer') as the test user 102a and may have similar confidence score '0.5' for the personality attribute 'neuroticism'. In such a scenario, the model generator 212 may be configured to increase the weight assigned to the first link. However, if the test user 102b is not associated with the same job title (e.g., 'lead web developer') as the test user 102a and has the similar confidence score '0.5' for the personality attribute 'neuroticism', the model generator 212 may be configured to adjust the weight assigned to the first link and may generate a weighted second link between the job title of the test user 102b and the confidence scores derived for the test user 102b. The model generator 212 may be configured to generate the predictor models 322 by using the weighted links. It will be apparent to a person of ordinary skill in the art that the abovementioned examples are for illustrative purpose, the model generator 212 may use other complex models of mapping the set of features to the personality attributes 318 without deviating from the scope of the disclosure.

The predictor models 322 generated by the model generator 212 may include at least three predictor models. The first predictor model may be capable of predicting personality attributes based on the target resume of the target user 110. The second predictor model may be capable of predicting personality attributes based on analyzed historical data 306 of the target user 110. The third predictor model may be capable of predicting business outcomes based on the predicted and derived personality attributes and the target resume of the target user 110. The model generator 212 may be further configured to store the predictor models 322 in the database server 108. The predictor models 322 may be used by the prediction module 216 for predicting business outcomes as described in conjunction with FIGS. 4-7.

It will be apparent to a person of ordinary skill in the art that the set of features (as represented by block 316) and the personality attributes 318 are shown for illustrative purpose. It will be apparent to a person of skill in the art that the abovementioned examples are for illustrative purpose and should not be construed to limit the scope of the disclosure.

Figure 4:
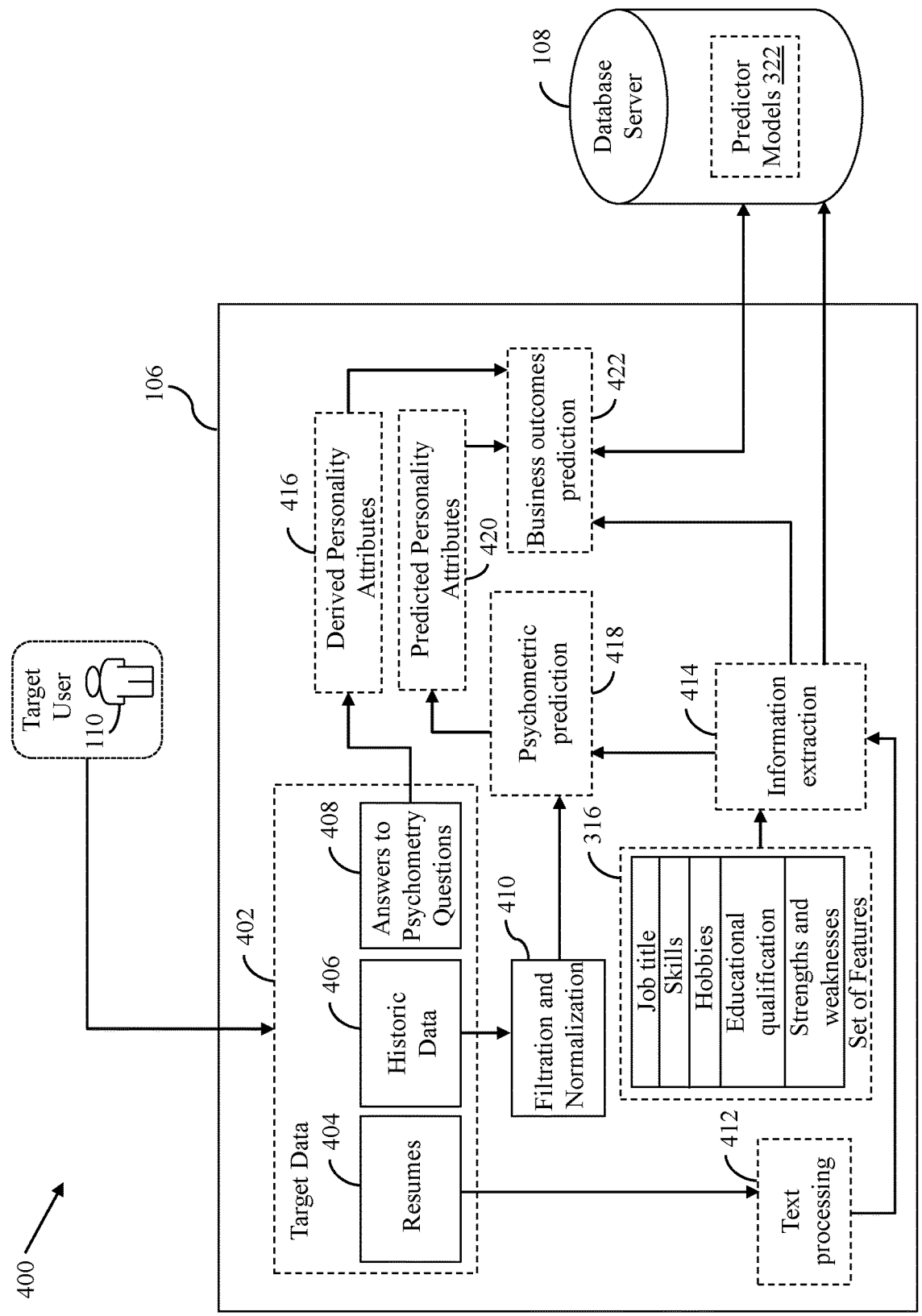
FIG. 4 is a block diagram that illustrates an exemplary scenario for predicting business outcomes, in accordance with an exemplary embodiment of the disclosure.

FIG. 4 is a block diagram that illustrates an exemplary scenario 400 for predicting business outcomes, in accordance with an exemplary embodiment of the disclosure. The exemplary scenario 400 involves the target user 110 who may provide target data 402, the application server 106, and the database server 108 that stores the predictor models 322. The exemplary scenario 400 illustrates a scenario where the target data 402 includes a target resume 404 of the target user 110, historical data 406 of the target user 110, and answers 408 provided by the target user 110 to the psychometric questions.

The target resume 404 may correspond to a curriculum vitae, a resume, or a job application of the target user 110. In one embodiment, the application server 106 may be configured to retrieve the target resume 404 from the target-user device 112 or from an online platform or database, based on the consent of the target user 110. In one embodiment, the application server 106 may be configured to utilize the software application that runs on the target-user device 112 to retrieve, with the consent of the target user 110, the target resume 404 stored in the memory of the target-user device 112.

The historical data 406 of the target user 110 may include the curriculum information, the education particulars, the travel history, the employment details, and the purchase history of the target user 110. For example, the target-user device 112, executing the software application hosted by the application server 106, may be configured to access the activity log of the target user 110 on the Internet and social media platforms to provide the travel history and the purchase history of the target user 110 to the application server 106. Based on a consent of the target user 110, the application server 106 may be configured to utilize the software application that runs on the target-user device 112 for accessing the social media profile (for example LinkedIn®, Facebook®, or the like) of the target user 110 and retrieving the education, job particulars of the target user 110, and one or more posts that are shared, liked, or followed by the target user 110 on the social media profile. The application server 106 may be further configured to communicate a questionnaire to the target user 110, regarding the historical data 406 of the target user 110 through the software application, for answering. The target-user device 112 may be configured to communicate to the application server 106 a response provided by the target user 110 to the questionnaire and the application server 106 may be configured to the include the response of the target user 110 in the historical data 406.

The application server 106 may be further configured to prompt the target user 110 through the software application that runs on the target-user device 112 to take one or more online tests (such as, but not limited to, the multiple intelligence quiz, the BIG 5, or the personal globe inventory) including the psychometric questions. The answers 408 to the psychometric questions are then provided by the target user 110. In another embodiment, the application server 106 may be configured to retrieve the answers 408 from the third-party servers that conduct the psychometric analysis of users via online tests.

After retrieving the target data 402, the application server 106 may be configured to process the target data 402. Processing of the target data 402 may involve normalizing and filtering (as represented by block 410) the historical data 406. Processing of the target data 402 may further involve analyzing the target resume 404. Before analyzing the target resume 404, the feature extraction module 218 may be configured to query the database server 108 to check if the target resume 404 has been analyzed previously during the learning phase or previous prediction phases. The feature extraction module 218 may not analyze the already analyzed target resume 404 and may query the database server 108 to retrieve the text data corresponding to the already analyzed target resume 404. For analyzing the target resume 404 that has not been analyzed yet, the feature extraction module 218 may be configured to execute text processing (as represented by block 412) followed by information extraction (as represented by block 414). During text processing and information extraction, the feature extraction module 218 may be configured to parse the target resume 404 for extracting the second text data corresponding to the set of features (as represented by block 316). The set of features may include, but are not limited to, job titles, skills, hobbies, educational qualification, strengths and weakness of the target user 110. The feature extraction module 218 may be configured to store the extracted second text data in the database server 108. Processing of the target data 402 may further involve analyzing the answers 408 by the first processor 202 for deriving personality attributes 416 (hereinafter, referred to as "derived personality attributes 416") of the target user 110.

After the target data 402 is processed, the prediction module 216 may be configured to query the database server 108 to retrieve the predictor models 322. The prediction module 216 may be configured to use the second text data extracted from the target resume 404 and the analyzed historical data 406 as input to the first and second predictor models, respectively, for psychometric prediction (as represented by block 418). The psychometric prediction may yield predicted personality attributes 420 of the target user 110 as output.

The prediction module 216 may be further configured to use the extracted second text data, the derived personality attributes 416, and the predicted personality attributes 420 as input to the third predictor model for predicting business outcomes (as represented by block 422). The application server 106 may be configured to store the predicted business outcomes in the database server 108. In an embodiment, the business outcomes may include, but are not limited to, job suggestions, purchase suggestions, targeted advertisements, music suggestions, or compatibility match. The application server 106 may be configured to communicate the predicted business outcomes to the target user 110. Thus, based on the predicted business outcomes, intelligent and informed decisions (such as accepting or denying a job offer, purchasing a new product, listening suggested music files, and the like) may be made by the target user 110. In another embodiment, the business outcomes may include, but are not limited to, a purchase trend of various commodities, affinity of the target user 110 for one or more activities, and the like. The application server 106 may communicate the predicted business outcomes to an organization, such as a social media provider, an e-commerce provider, or the like. Thus, based on the predicted business outcomes, intelligent and informed decisions (such as providing relevant job suggestions to the target user 110 on the social media profile of the target user 110 or customizing the social media profile of the target user 110 based on the interests of the target user 110) may be made by the social media provider. Likewise, based on the predicted business outcomes, the e-commerce provider may make intelligent decisions, such as updating their inventory based on the purchase trend, or the like. The e-commerce platform may divide customers into different groups based on their common purchase interests (i.e., business outcomes). Moreover, deep personalization of a customer (i.e., analyzing resumes of the customer) to understand more complex patterns of customer behavior (i.e., business outcomes) and preferences may help the e-commerce platform to grow.

In another exemplary scenario, the target user 110 may be a person to be hired by an organization. In this scenario, the target resume 404 corresponding to the target user 110 may be obtained and analyzed by using the predictor models 322 to get accurate prediction of the personality of the target user 110, without asking any question to the target user 110. In another exemplary scenario, the target user 110 may be an employee of the organization, whose employment affinity (i.e., a business outcome) is of interest to the organization, such as for employee retention and engagement. In another exemplary scenario, the disclosure may be implemented to achieve emotional intelligence within robots, i.e., improving efficiency with which robots learn emotional attributes.

It will be understood by a person of ordinary skill in the art that the abovementioned business outcomes are listed for exemplary purpose and should not be construed to limit the scope of the disclosure. In other embodiments, the predictor models 322 may be utilized to predict business outcomes that are different from the business outcomes mentioned above.

In one embodiment, the application server 106 may be configured to render a user interface (UI) on the target-user device 112 for presenting the predicted business outcomes to the target user 110. In one example, the application server

106 may render the UI through the software application that runs on the target-user device 112. A feedback (for example, a common score or an individual score for each business outcome) may be provided by the target user 110 to indicate a relevance of the predicted business outcomes. For example, when the business outcomes have high relevance to the target user 110, a positive feedback may be provided by the target user 110. In another example, when the business outcomes have low relevance to the target user 110, a negative feedback may be provided by the target user 110. The model generator 212 may use the feedback provided by the target user 110 to update the predictor models 322 for improving the prediction accuracy. The model generator 212 may be configured to adjust the weight of links between the set of features and the personality attributes based on the feedback.

Figure 5:
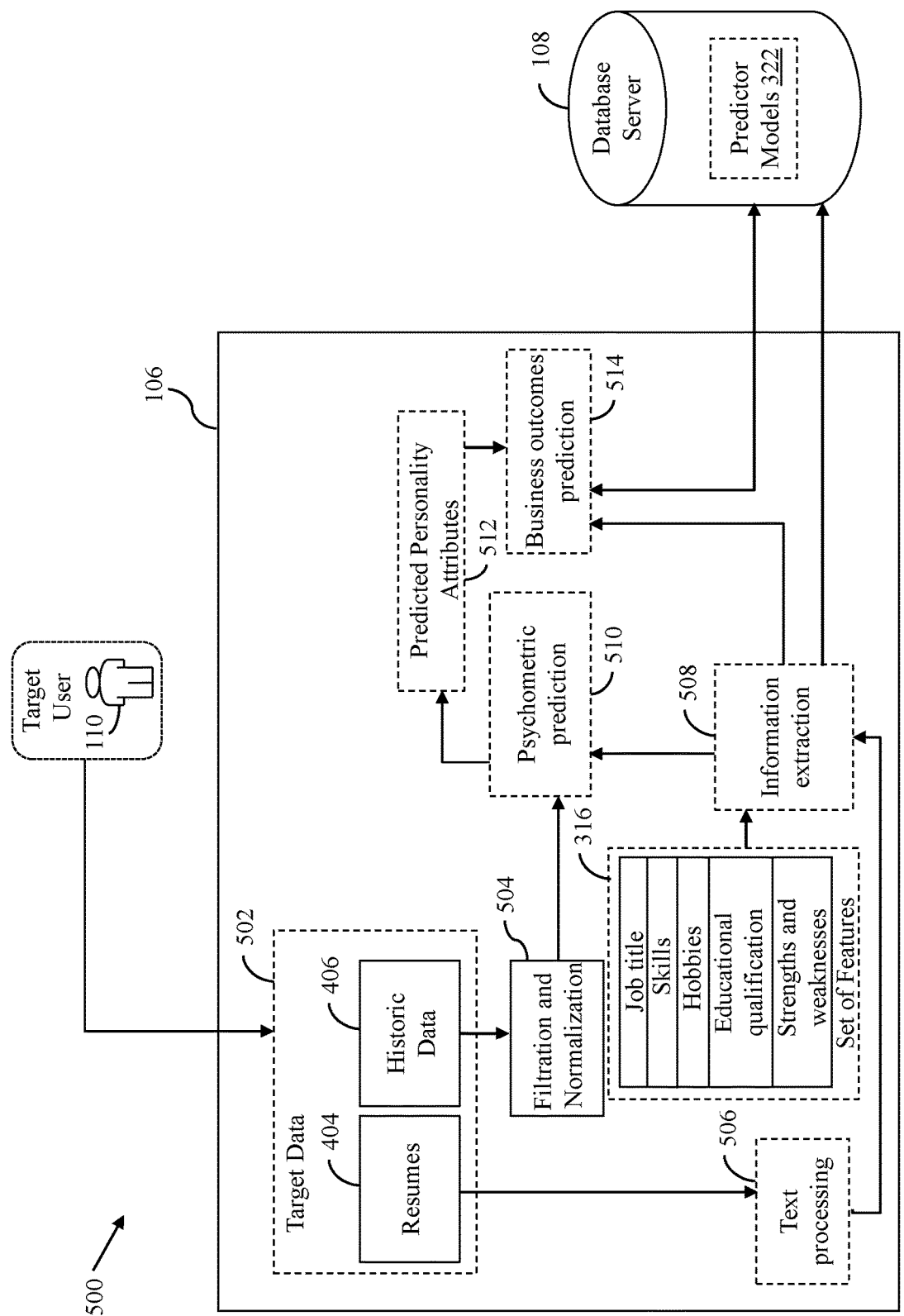
FIG. 5 is a block diagram that illustrates another exemplary scenario for predicting business outcomes, in accordance with another exemplary embodiment of the disclosure.

FIG. 5 is a block diagram that illustrates an exemplary scenario 500 for predicting business outcomes, in accordance with another exemplary embodiment of the disclosure. The exemplary scenario 500 involves the target user 110 who may provide target data 502, the application server 106, and the database server 108 that may store the predictor models 322. The exemplary scenario 500 illustrates a scenario where the target data 502 includes the target resume 404 of the target user 110 and the historical data 406 of the target user 110. The retrieval of the target resume 404 and the historical data 406 is described in FIG. 4.

After retrieving the target data 502, the application server 106 may be configured to process the target data 502. The filtration and normalization module 214 may normalize and filter (as represented by block 504) the historical data 406. Before analyzing the target resume 404, the feature extraction module 218 may be configured to query the database server 108 to check if the target resume 404 has been analyzed previously during the learning phase or previous prediction phases. The feature extraction module 218 may not analyze the already analyzed target resume 404 and may query the database server 108 to retrieve the text data corresponding to the already analyzed target resume 404. For analyzing the target resume 404 that has not been analyzed yet, the feature extraction module 218 may be configured to execute text processing (as represented by block 506) followed by information extraction (as represented by block 508). During text processing and information extraction, the feature extraction module 218 may be configured to parse the target resume 404 for extracting the second text data corresponding to the set of features (as represented by block 316). The set of features may include, but are not limited to, the job titles, the skills, the hobbies, the educational qualification, the strengths and weaknesses, and/or the like. The feature extraction module 218 may be configured to store the extracted second text data in the database server 108. Since the target data 502 does not include answers to psychometric questions, the first processor 202 may not derive any personality attributes of the target user 110.

After the target data 502 is processed, the prediction module 216 may be configured to query the database server 108 to retrieve the predictor models 322. The prediction module 216 may be configured to use the second text data extracted from the target resume 404 and the analyzed historical data 406 as input to the first and second predictor models, respectively, for psychometric prediction (as represented by block 510). The psychometric prediction may yield predicted personality attributes 512 as output.

The prediction module 216 may be configured to use the extracted second text data and the predicted personality attributes 512 as input to the third predictor model for predicting the business outcomes (as represented by block 514). The predicted business outcomes may be relevant to the target user 110 and/or an organization as described in FIG. 4. The application server 106 may be configured to store the predicted business outcomes in the database server 108.

Figure 6:
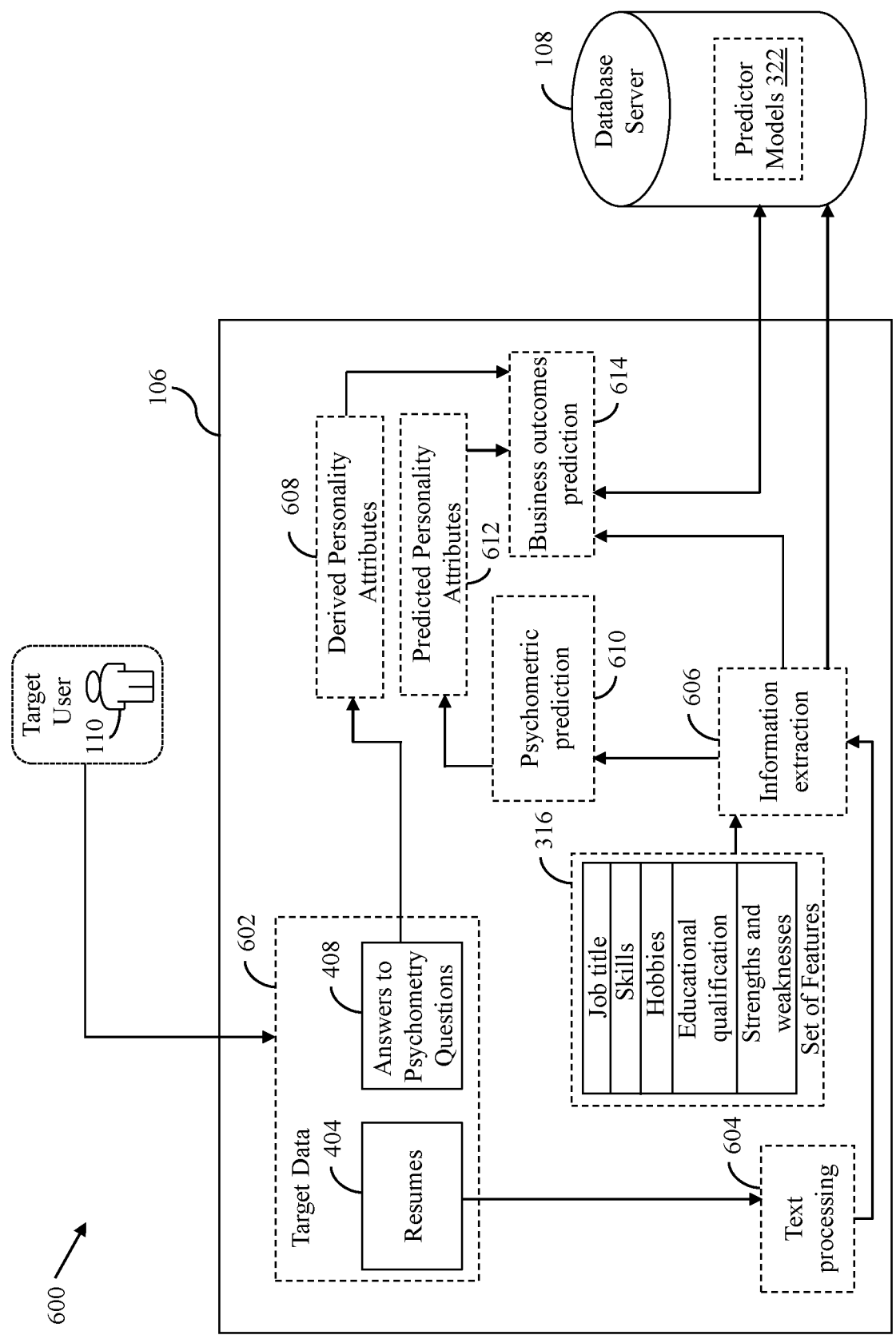
FIG. 6 is a block diagram that illustrates another exemplary scenario for predicting business outcomes, in accordance with another exemplary embodiment of the disclosure.

FIG. 6 is a block diagram that illustrates an exemplary scenario 600 for predicting business outcomes, in accordance with another exemplary embodiment of the disclosure. The exemplary scenario 600 involves the target user 110 who may provide target data 602, the application server 106, and the database server 108 that may store the predictor models 322. The exemplary scenario 600 illustrates a scenario where the target data 602 includes the target resume 404 of the target user 110 and the answers 408 provided by the target user 110 to the psychometric questions. The retrieval of the target resume 404 and the answers 408 is described in FIG. 4.

After retrieving the target data 602, the application server 106 may be further configured to process the target data 602. Before analyzing the target resume 404, the feature extraction module 218 may be configured to query the database server 108 to check if the target resume 404 has been analyzed previously by the feature extraction module 218 during the learning phase or previous prediction phases. The feature extraction module 218 may not analyze the already analyzed target resume 404 and may query the database server 108 to retrieve the text data corresponding to the already analyzed target resume 404. For analyzing the target resume 404 that has not been analyzed yet, the feature extraction module 218 may be configured to execute text processing (as represented by block 604) followed by information extraction (as represented by block 606). During text processing and information extraction, the feature extraction module 218 may be configured to parse the target resume 404 for extracting the second text data corresponding to the set of features (as represented by block 316). The feature extraction module 218 may be configured to store the extracted second text data in the database server 108. Processing of the target data 602 may further involve analyzing the answers 408 by the first processor 202 for deriving personality attributes 608 (hereinafter, referred to as "derived personality attributes 608") of the target user 110.

After the target data 602 is processed, the prediction module 216 may be configured to query the database server 108 to retrieve the predictor models 322. The prediction module 216 may be configured to use the extracted second text data as input to the first predictor model for psychometric prediction (as represented by block 610). The psychometric prediction may yield predicted personality attributes 612 as output.

The prediction module 216 may be further configured to use the extracted second text data, the derived personality attributes 608, and the predicted personality attributes 612 as input to the third predictor model for predicting the business outcomes (as represented by block 614). The predicted business outcomes may be relevant to the target user 110 and/or an organization as described in FIG. 4. The application server 106 may be configured to store the predicted business outcomes in the database server 108.

Figure 7:
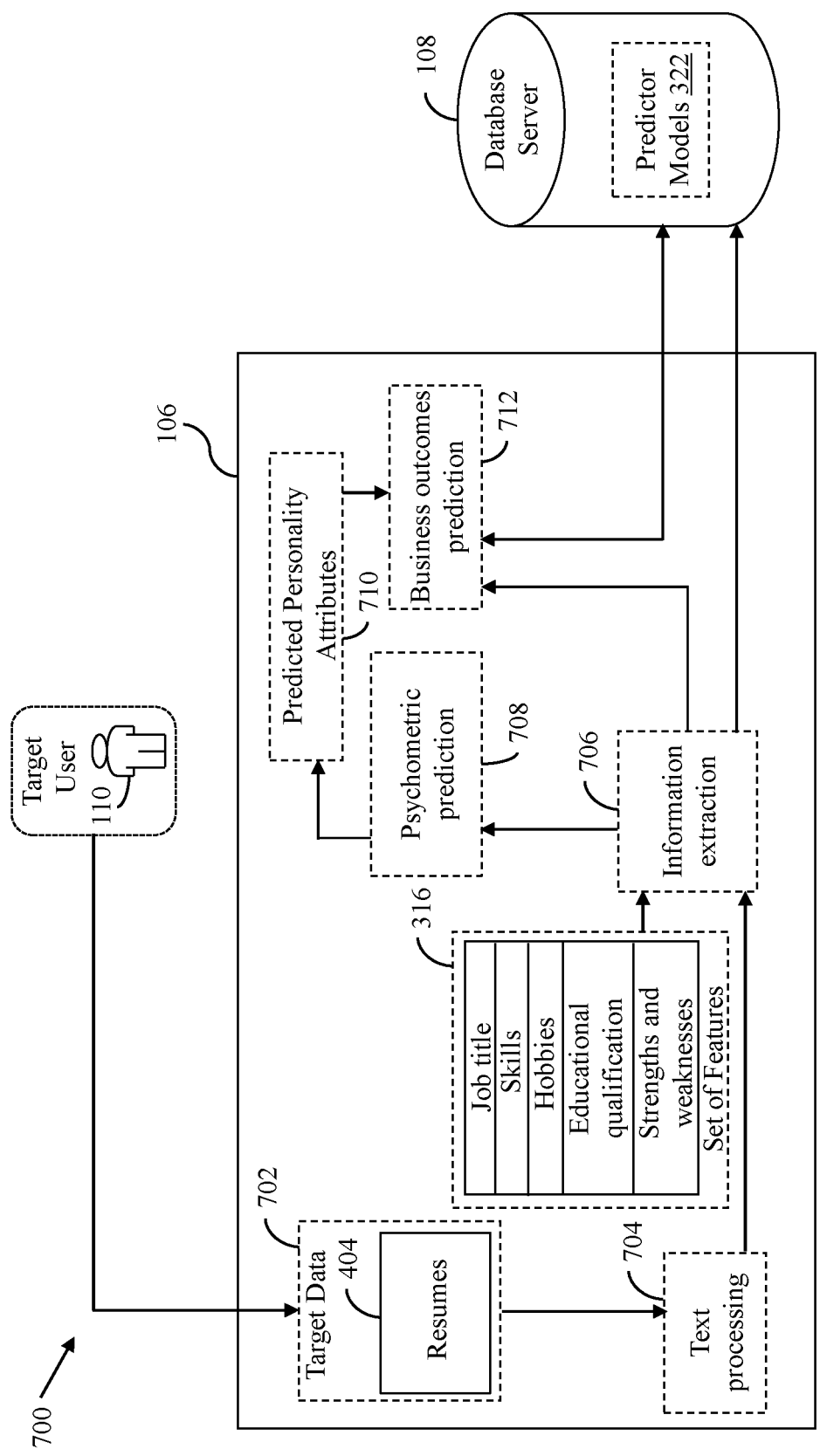
FIG. 7 is a block diagram that illustrates another exemplary scenario for predicting business outcomes, in accordance with another exemplary embodiment of the disclosure.

FIG. 7 is a block diagram that illustrates an exemplary scenario 700 for predicting business outcomes, in accordance with another exemplary embodiment of the disclosure. The exemplary scenario 700 involves the target user 110 who may provide target data 702, the application server 106, and the database server 108 that may store the predictor models 322. The exemplary scenario 700 illustrates a scenario where the target data 702 includes only the target resume 404 of the target user 110. The retrieval of the target resume 404 is described in FIG. 4.

After retrieving the target data 702, the application server 106 may be configured to process the target data 702. Before analyzing the target resume 404, the feature extraction module 218 may be configured to query the database server 108 to check if the target resume 404 has already been analyzed by the feature extraction module 218 during the learning phase or previous prediction phases. The feature extraction module 218 may be configured to execute text processing (as represented by block 704) followed by feature data extraction (as represented by block 706) on the target resume 404 that is not analyzed yet. During text processing and information extraction, the feature extraction module 218 may be configured to parse the target resume 404 for extracting the second text data corresponding to the set of features (as represented by block 316). The feature extraction module 218 may be configured to store the extracted second text data in the database server 108. Since the target data 702 does not include answers to psychometric questions, the first processor 202 does not derive any personality attributes of the target user 110.

After the target data 702 is processed, the prediction module 216 may be configured to query the database server 108 to retrieve the predictor models 322. The prediction module 216 may be configured to use the extracted second text data as input to the first predictor model for psychometric prediction (as represented by block 708). The psychometric prediction may yield predicted personality attributes 710 as output. The prediction module 216 may be further configured to use the extracted second text data and the predicted personality attributes 710 as input to the third predictor model for predicting the business outcomes (as represented by block 712). The predicted business outcomes may be relevant to the target user 110 and/or an organization as described in FIG. 4. The application server 106 stores the predicted business outcomes in the database server 108.

FIG. 8 is a block diagram 800 that illustrates the test resume of the test user 102a, in accordance with an exemplary embodiment of the disclosure. Hereinafter, the test resume of the test user 102a is designated and referred to as the test resume 802. The test resume 802 includes various sections, such as sections 804-814.

The section 804 indicates the name (i.e., 'John Doe') of the test user 102a. The section 806 indicates job positions (e.g., 'lead web developer', 'senior web developer', and 'associate web developer') associated with the test user 102a. The section 806 further indicates organizations (e.g., 'ABC Inc.' and 'XYZ technologies ltd.') associated with the job positions, and work experience (e.g., '2 years') and responsibilities associated with the job positions. The section 808 indicates the educational qualification (e.g., 'bachelor of Science in Computer Science from PQR University') of the test user 102a. The section 810 indicates the skills of the test user 102a. For example, the section 810 indicates a proficiency of the test user 102a in 'C', 'C++', 'Ruby on rails', and 'JavaScript'. The section 812 indicates the awards (e.g., 'ABCDE award' and 'EFGHI' award') won by the test user 102a and the section 814 indicates the hobbies (e.g., skiing, dancing, and gaming) of the test user 102a.

It will be apparent to those of skill in the art that the test resume 802 is merely exemplary and does not limit the scope of the disclosure in any manner. In other embodiments, the test resume 802 may include sections other than the sections 804-814. Further, the test resumes 304 of the other test users 102b-102n and the target resume 404 of the target user 110 may be similar to the test resume 802.

Figure 9A:
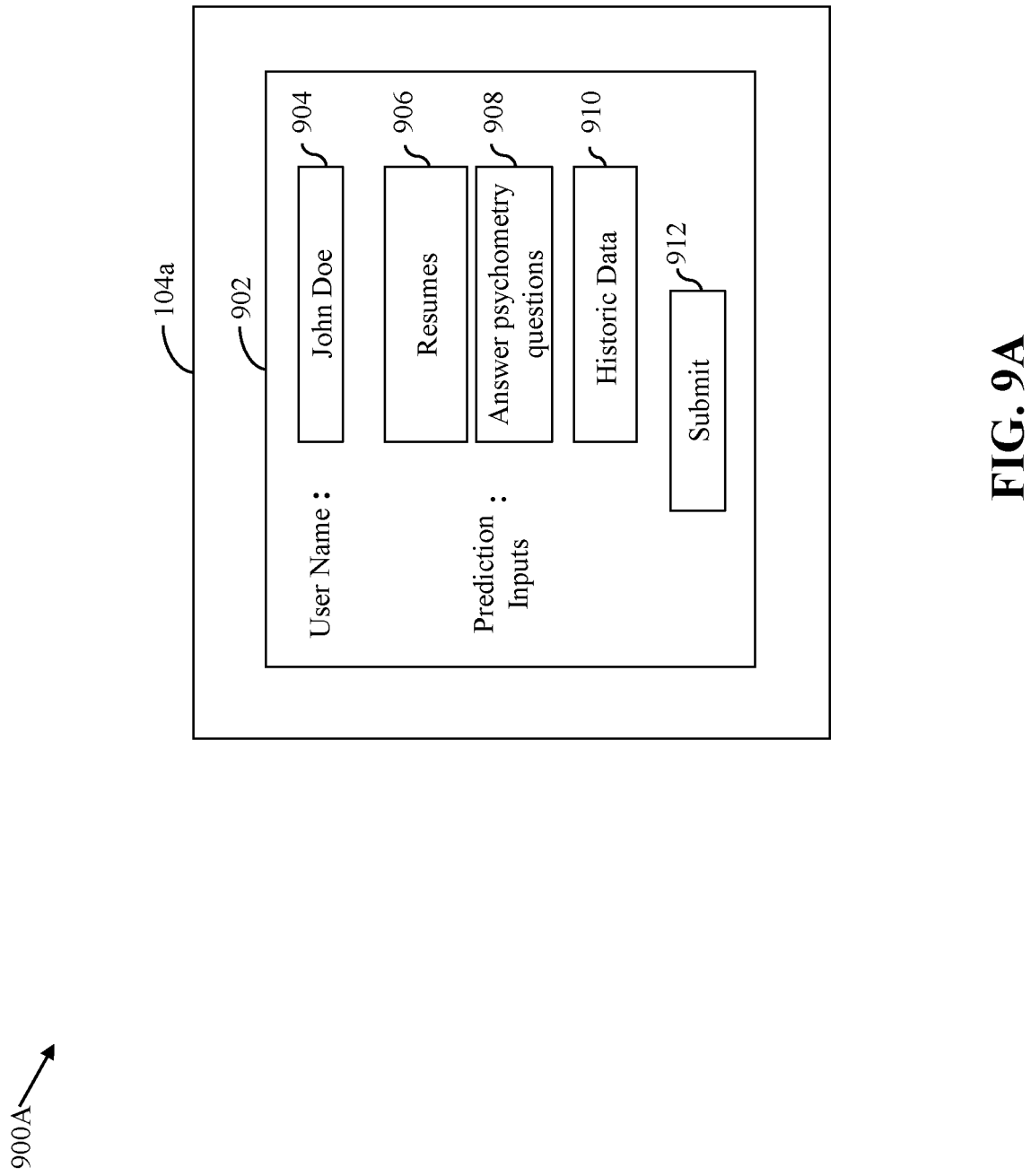
FIG. 9A is a block diagram that illustrates a user interface (UI) rendered on a test-user device by the application server for receiving test data of a test user, in accordance with an exemplary embodiment of the disclosure.

FIG. 9A is a block diagram 900A that illustrates a UI 902 rendered on the test-user device 104a by the application server 106 for receiving the test data 302 of the test user 102a, in accordance with an exemplary embodiment of the disclosure. The UI 902 may include a first input box 904, where a name (for example, "John Doe") is required to be entered by the test user 102a. The UI 902 may further include first through third options 906-910 pertaining to prediction inputs (i.e., the test data 302) required from the test user 102a. The first through third options 906-910 may be selectable by the test user 102a. If the first option 906 is selected by the test user 102a, the application server 106 may be configured to retrieve the test resume 802 corresponding to the test user 102a (as described in FIGS. 3 and 8). If the second option 908 is selected by the test user 102a, the application server 106 may be configured to retrieve the answers 308 provided by the test user 102a to the psychometric questions (as described in FIG. 3). If the third option 910 is selected by the test user 102a, the application server 106 may be configured to retrieve the historical data 306 of the test user 102a (as described in FIG. 3). The UI 902 may further include a submit button 912, which may be selected by the test user 102a to submit the test data 302 to the application server 106.

It will be apparent to a person of ordinary skill in the art that the UI 902 is shown for illustrative purposes and should not be construed to limit the scope of the disclosure. In another embodiment, the application server 106 may render the UI 902 on the target-user device 112 for retrieving the target data (such as the target data 402, 502, 602, or 702) of the target user 110. The application server 106 may be configured to retrieve the target data (as described in FIGS. 4-7) based on the selection performed by the target user 110. For example, if the second option 908 is not selected and the third option 910 is selected by the target user 110, the application server 106 may retrieve only the target resume 404 and the historical data 406 of the target user 110.

Figure 9B:
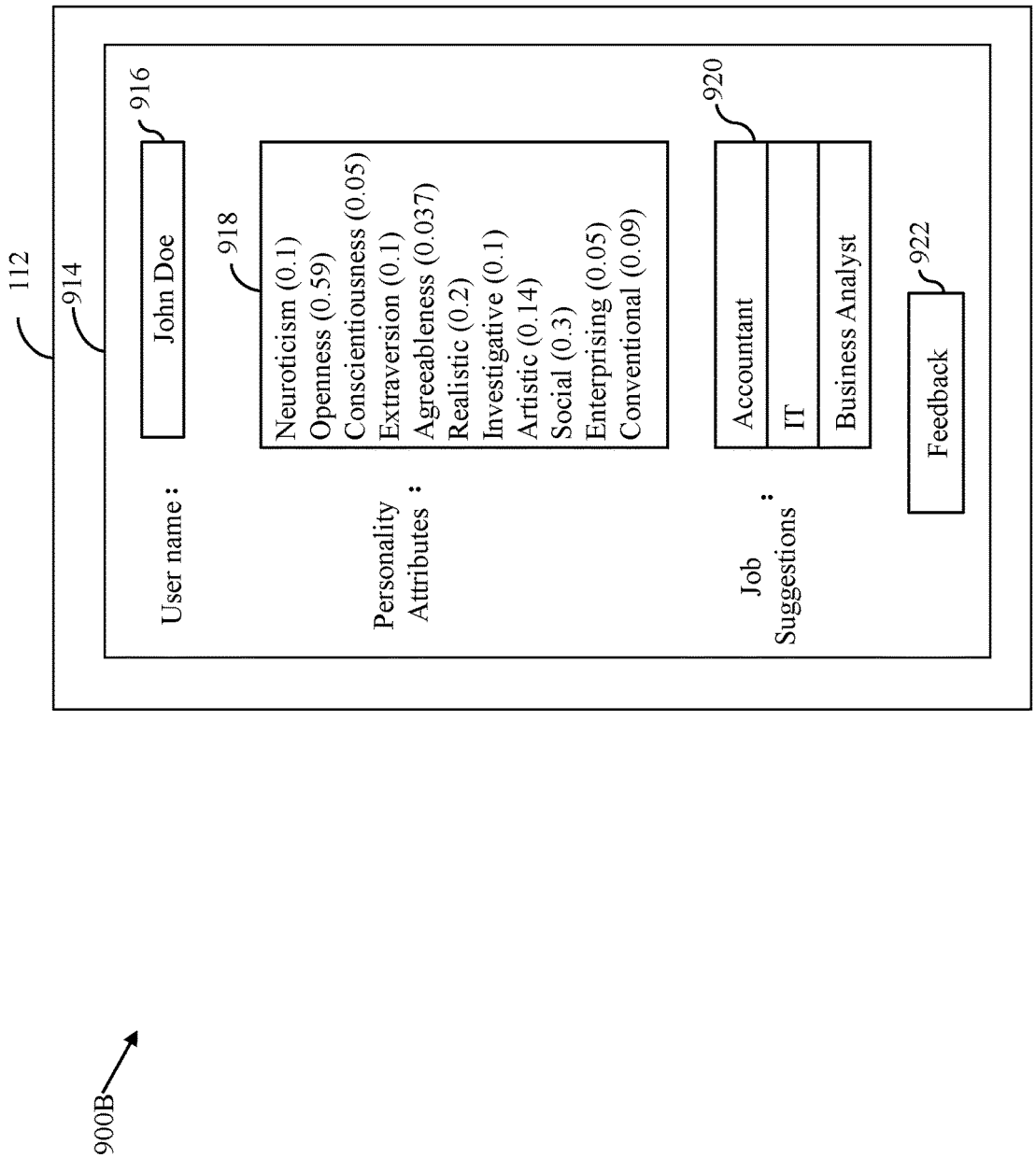
FIG. 9B is a block diagram that illustrates a UI rendered on a target-user device by the application server for presenting predicted business outcomes, in accordance with an exemplary embodiment of the disclosure.

FIG. 9B is a block diagram 900B that illustrates a UI 914 rendered on the target-user device 112 by the application server 106 for presenting predicted business outcomes, in accordance with an exemplary embodiment of the disclosure. The UI 914 may include a first field 916, where the name of the target user 110 is displayed (for example, "John Doe"). The UI 914 may further include a first table 918 that may display personality attributes (i.e., derived or predicted psychometric features) of the target user 110 and corresponding confidence scores. For example, the personality attributes of the target user 110 may be neuroticism, openness, conscientiousness, extraversion, agreeableness, realistic, investigative, social, enterprising, and conventional having the confidence scores as 0.1, 0.59, 0.05, 0.01, 0.037, 0.2, 0.1, 0.14, 0.3, 0.05, and 0.09, respectively. The UI 914 may further include a second table 920 that may display various job suggestions (such as Accountant, IT, and Business analyst) for the target user 110 and corresponding confidence scores. Likewise, the UI 914 may include additional tables (not shown) that display relevant business outcomes, such as product purchase suggestions, travel suggestions, music suggestions, and the like, to the target user 110. The UI 914 may further include a feedback button 922. The target user 110 may select the feedback button 922 for providing a feedback, such as a score for each business outcome or a collective score, to the application server 106 indicating the relevance of the predicted business outcomes displayed in the second table 920.

Figure 10A:
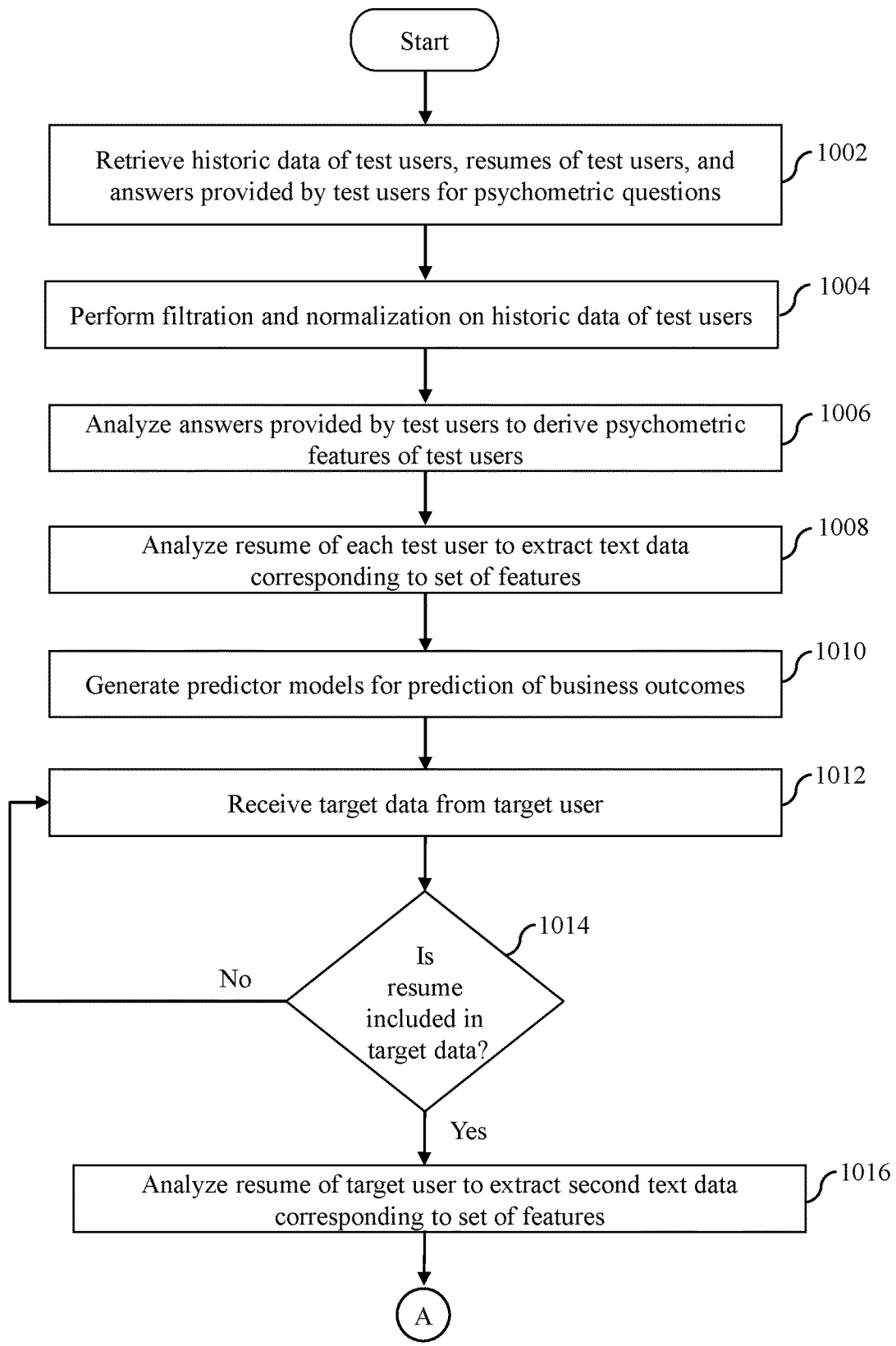
FIGS. 10A and 10B, collectively represent a flow chart that illustrates a method for predicting business outcomes, in accordance with an exemplary embodiment of the disclosure.
Figure 10B:
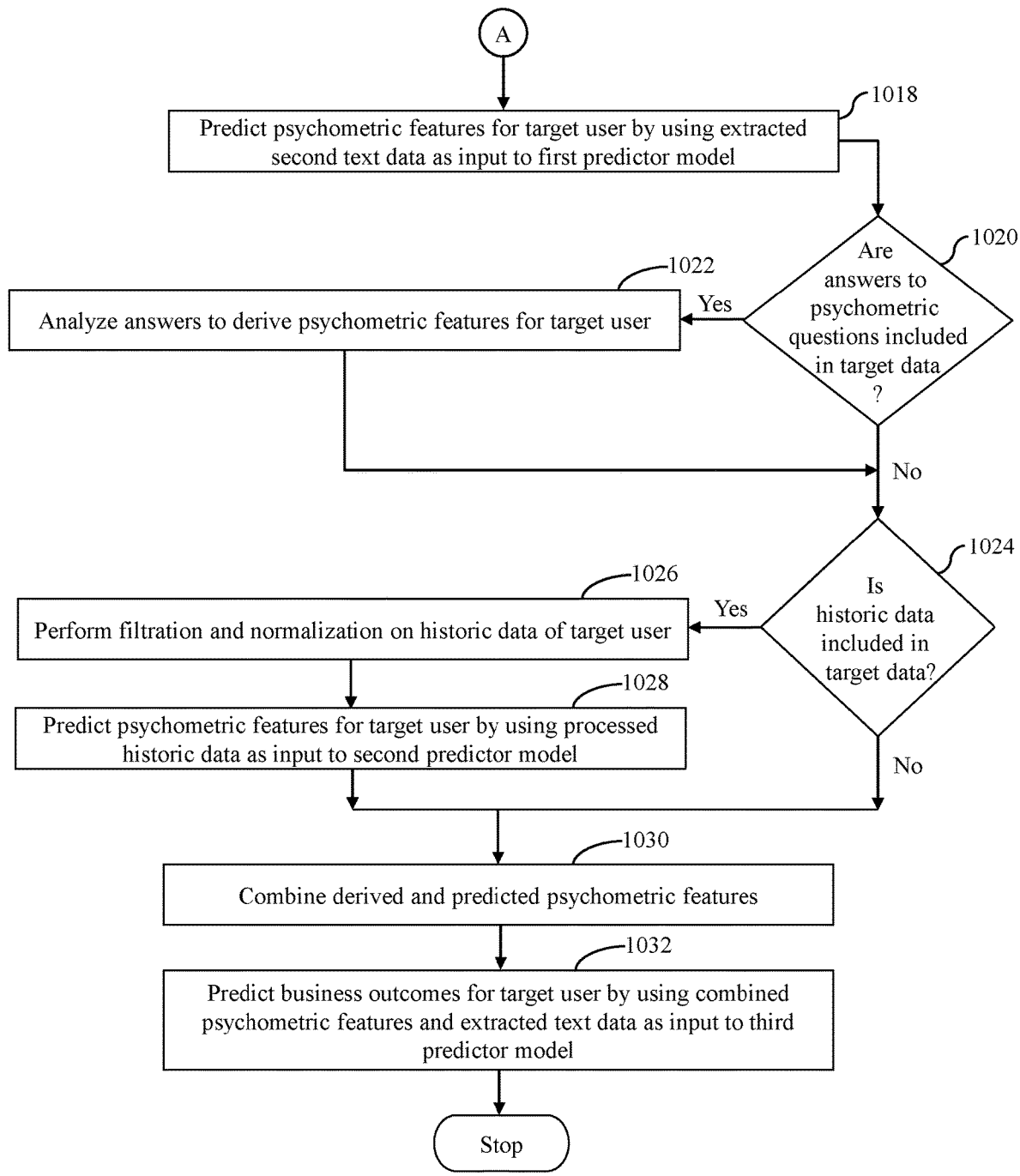

FIGS. 10A and 10B, collectively represent a flow chart 1000 that illustrates a method for predicting business outcomes, in accordance with an exemplary embodiment of the disclosure. At 1002, the historical data 306 of the test users 102, the test resumes 304 associated with the test users 102, and the answers 308 provided by the test users 102 to the psychometric questions (i.e., the test data 302 as described in FIG. 3) are retrieved. The application server 106 may retrieve the historical data 306, the test resumes 304, and the answers 308. At 1004, the historical data 306 of the test users 102 is filtered and normalized (as described in FIG. 3). At 1006, the answers 308 provided by the test users 102 are analyzed for deriving psychometric features of the test users 102 (as described in FIG. 3). At 1008, the test resume 304 of each test user 102 is analyzed for extracting the first text data corresponding to the set of features (as represented by block 316 in FIG. 3). The application server 106 may be configured to analyze the test resumes 304 by selecting one resume at a time from the test resumes 304.

At 1010, the predictor models 322 for prediction of business outcomes are generated (as described in FIG. 3). The predictor models 322 may be generated by the application server 106 by using the machine learning algorithms. At 1012, the target data (such as the target data 402, 502, 602, or 702) is received from the target user 110. At 1014, it is determined whether the target data includes the target resume of the target user 110. If, at 1014, it is determined that the target data does not include the target resume 404 of the target user 110, control passes to 1012. The application server 106 performs 1012 again until the target resume 404 of the target user 110 is received. If, at 1014, it is determined that the target data includes the target resume 404, control passes to 1016. At 1016, the target resume 404 of the target user 110 is analyzed for extracting the second text data corresponding to the set of features (as represented by block 316 of FIG. 3). The process of extracting the second text data from the target resume 404 is same as that performed for the test resumes 304 of the test users 102.

At 1018, the psychometric features (such as personality attributes) are predicted for the target user 110 by using the extracted second text data as input to the first predictor model. At 1020, it is determined whether the target data includes the answers 408 to the psychometric questions. If, at 1020, it is determined that the target data includes the answers 408, control passes to 1022. At 1022, the answers 408 are analyzed for deriving the psychometric features of the target user 110 (as described in FIG. 4). Control passes to 1024. If, at 1020, it is determined that the target data does not include the answers 408, control passes to 1024. At 1024, it is determined whether the target data includes the historical data 406. If, at 1024, it is determined that the target data includes the historical data 406, control passes to 1026. At 1026, the historical data 406 of the target user 110 is filtered and normalized. At 1028, the psychometric features are predicted for the target user 110 by using the processed historical data 406 as input to the second predictor model. Control passes to 1030. If, at 1024, it is determined that the target data does not include the historical data 406, control passes to 1030. At 1030, the derived and predicted psychometric features are combined. At 1032, the business outcomes for the target user 110 are predicted by using the combined psychometric features (i.e., the derived and predicted psychometric features) and the extracted second text data as input to the third predictor model.

Figure 11:
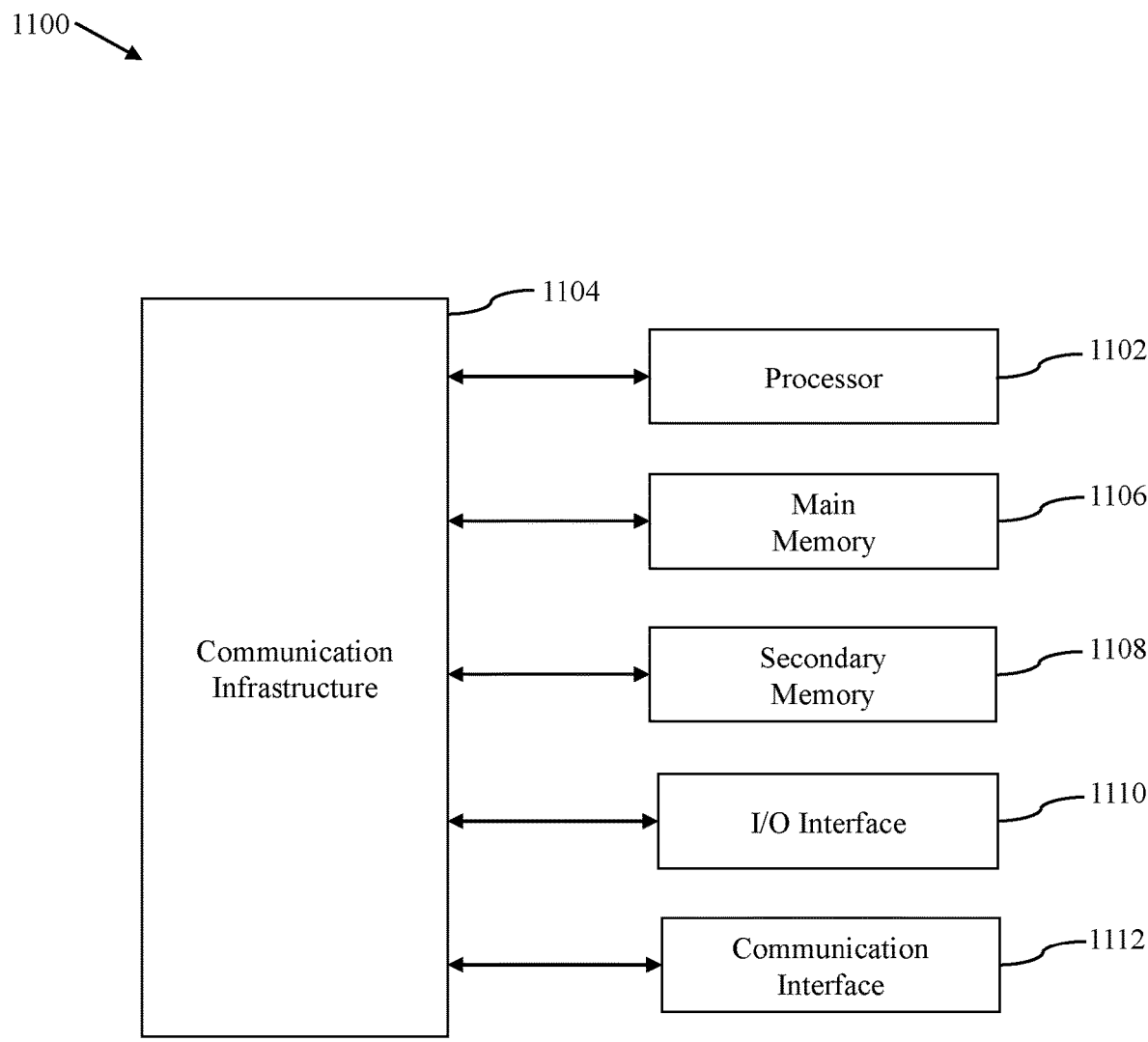
FIG. 11 is a block diagram that illustrates system architecture of a computer system, in accordance with an exemplary embodiment of the disclosure.

FIG. 11 is a block diagram that illustrates system architecture of a computer system 1100, in accordance with an exemplary embodiment of the disclosure. An embodiment of disclosure, or portions thereof, may be implemented as computer readable code on the computer system 1100. In one example, the test-user and target-user devices 104 and 112 and the database server 108 of FIG. 1 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIGS. 10A and 10B.

The computer system 1100 may include a processor 1102 that may be a special-purpose or a general-purpose processing device. The processor 1102 may be a single processor, multiple processors, or combinations thereof. The processor 1102 may have one or more processor cores. In one example, the processor 1102 is an octa-core processor. Further, the processor 1102 may be connected to a communication infrastructure 1104, such as a bus, message queue, multi-core message-passing scheme, and the like. The computer system 1100 may further include a main memory 1106 and a secondary memory 1108. Examples of the main memory 1106 may include RAM, ROM, and the like. The secondary memory 1108 may include a hard disk drive or a removable storage drive, such as a floppy disk drive, a magnetic tape drive, a compact disk, an optical disk drive, a flash memory, and the like. Further, the removable storage drive may read from and/or write to a removable storage device in a manner known in the art. In one example, if the removable storage drive is a compact disk drive, the removable storage device may be a compact disk. In an embodiment, the removable storage unit may be a non-transitory computer readable recording media.

The computer system 1100 may further include an input/output (I/O) interface 1110 and a communication interface 1112. The I/O interface 1110 may include various input and output devices that are configured to communicate with the processor 1102. Examples of the input devices may include a keyboard, a mouse, a joystick, a touchscreen, a microphone, and the like. Examples of the output devices may include a display screen, a speaker, headphones, and the like. The communication interface 1112 may be configured to allow data to be transferred between the computer system 1100 and various devices that are communicatively coupled to the computer system 1100. Examples of the communication interface 1112 may include a modem, a network interface, i.e., an Ethernet card, a communication port, and the like. Data transferred via the communication interface 1112 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1100. Examples of the communication channel may include, but are not limited to, cable, fiber optics, a phone line, a cellular phone link, a radio frequency link, and the like. The main memory 1106 and the secondary memory 1108 may refer to non-transitory computer readable mediums that may provide data that enables the computer system 1100 to implement the method illustrated in FIGS. 10A and 10B. In embodiments where the main memory 1106 and/or the secondary memory 1108 comprise non-transitory computer readable medium, the non-transitory computer readable medium may have stored thereon, computer executable code, which when executed by the processor 1102 in the computer system 1100, cause the processor 1102 and computer system 1100 to execute the operations disclosed herein, for example, the operation described with respect to FIG. 1 through FIG. 11.

Various embodiments of the present disclosure include the application server 106 for predicting business outcomes for the target user 110. The application server 106 may retrieve the historical data 306 the test users 102, the test resumes 304 of the test users 102, and the answers 308 provided by the test users 102 to the psychometric questions. The first processor 202 may analyze the answers 308 and the second processor 204 may analyze the test resumes 304. The answers 308 are analyzed for deriving one or more psychometric features (such as the personality attributes 318 in FIG. 3) of the test users 102. The test resumes 304 are analyzed for extracting first text data corresponding to a set of features from the test resumes 304. The model generator 212 may generate the predictor models 322 based on the historical data 306 of the test users 102, the first text data, and the one or more psychometric features of the test users 102. The prediction module 216 may predict one or more business outcomes for the target user 110 based on the one or more predictor models 322 and the target resume 404 of the target user 110.

In one embodiment, a non-transitory computer readable medium having stored thereon, computer executable instructions, which when executed by a computer, cause the computer to execute operations for predicting business outcomes for the target user 110 (as described in FIGS. 10A and 10B). The operations include retrieving the historical data 306 of at least one test user (for example, the test user 102a), a first resume (i.e., the test resume 802) of the test user 102a, and a first set of answers 308 provided by the test user 102a to a set of psychometric questions. The operations further include analyzing the first set of answers 308 and the test resume 802 by the first and second processors 202 and 204, respectively. The first set of answers 308 is analyzed for deriving one or more psychometric features (such as the personality attributes 318 in FIG. 3) of the test user 102a. The test resume 802 is analyzed for extracting first text data corresponding to a set of features from the test resume 802. The operations further include generating the predictor models 322, by the model generator 212, based on the historical data 306 of the test user 102a, the first text data, and the one or more psychometric features of the test user 102a. The operations further include predicting one or more business outcomes for the target user 110, by the prediction module 216, based on the predictor models 322 and a second resume (i.e., the target resume 404) of the target user 110.

Various embodiments of the disclosure include the application server 106 which may enable the prediction of business outcomes by analyzing the target resume 404 of the target user 110. The predictor models 322 generated by the application server 106 are trained based on the test data 302 of multiple test users 102. The test data 302 includes the test resumes 304, the historical data 306, and the answers 308 provided by the test users 102, which reflect the subconscious mind of the test users 102. As the subconscious mind is responsible for the majority of decision making and directly related to the psychometric orientation, the prediction accuracy of the predictor models 322 is very high. Thus, the disclosure yields more accurate results in comparison to the related techniques. The ability of the predictor models 322 to accurately predict psychometric orientation and business outcomes may provide competitive edge to a service company, utilizing the predictor models 322, over its competitors. For example, the service company may utilize technological improvements of the predictor models 322 to provide targeted services to the customers. The technological improvements provided by the predictor models 322 may be utilized to concurrently predict business outcomes for multiple target users, thereby reducing the time spent by organizations on data analytics for various operations, such as hiring, or the like. The disclosure provides improvements in technologies that are customer and employee centric. For example, e-commerce industries, business ventures, financial industries, or the like.

A person of ordinary skill in the art will appreciate that embodiments of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the disclosure provide, among other features, systems and methods for predicting business outcomes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   retrieving, by a server, historical data of a plurality of test users, a first set of answers provided by each of the plurality of test users to a set of psychometric questions, and a plurality of test resumes of the plurality of test users, wherein each test resume of the plurality of test resumes includes first text data;
   deriving, by the server, one or more psychometric features of each of the plurality of test users based on the first set of answers provided by each of the plurality of test users;
   extracting, by the server, from each of the plurality of test resumes, a portion of the first text data that corresponds to a set of features, wherein the extracted portion of the first text data includes one or more first phrases and one or more first terms that are indicative of the set of features;
   generating, by the server, a first predictor model and a second predictor model based on the historical data of the plurality of test users, the one or more psychometric features of each of the plurality of test users, and the portion of the first text data extracted from each of the plurality of test resumes;

receiving, by the server, a target resume of a target user, wherein the target resume includes second text data;

extracting, by the server, from the target resume, a portion of the second text data that corresponds to the set of features, wherein the extracted portion of the second text data includes one or more second phrases and one or more second terms that are indicative of the set of features;

predicting, by the server, one or more first psychometric features of the target user by using the extracted portion of the second text data as an input to the first prediction model;

predicting, by the server, one or more business outcomes for the target user based on the extracted portion of the second text data, the predicted one or more first psychometric features of the target user, and the second predictor model, wherein the one or more business outcomes include at least an employment affinity of the target user;

receiving, by the server, from a target user device of the target user, a feedback on a relevance of the predicted one or more business outcomes; and updating, by the server, the first predictor model and the second predictor model based on the received feedback to increase a prediction accuracy of the first predictor model and the second predictor model.

2. The method of claim 1, wherein the one or more business outcomes further include at least one of a product purchase affinity, a purchase behavior, or one or more job suggestions, and wherein the historical data includes at least one of educational qualification, a purchase history, a travel history, a social media history, one or more likes, or one or more dislikes of each of the plurality of test users.

3. The method of claim 1, wherein the set of features includes a job title, one or more skills, educational qualification, one or more hobbies, one or more strengths, and one or more weaknesses.

4. The method of claim 1, further comprising providing, by the server, the extracted portion of the second text data as input to the second predictor model for predicting the one or more business outcomes.

5. The method of claim 1, further comprising:
providing, by the server, the predicted one or more first psychometric features of the target user as input to the second predictor model for predicting the one or more business outcomes.

6. The method of claim 1, further comprising:
deriving, by the server, one or more second psychometric features of the target user based on a second set of answers provided by the target user to the set of psychometric questions; and
providing, by the server, the derived one or more psychometric second features of the target user as input to the second predictor model for predicting the one or more business outcomes.

7. The method of claim 1, further comprising:
mapping, by the server, each feature in the set of features with each psychometric feature of each of the plurality of test users to generate a link therebetween; and
assigning, by the server, a weight to the link between each feature in the set of features and each psychometric feature of each of the plurality of test users for generating the first predictor model and the second predictor model.

8. The method of claim 7, further comprising rendering, by the server, on the target user device of the target user, a user interface for presenting the one or more business outcomes to the target user.

9. The method of claim 8, wherein the feedback is provided to the target user device of the target user by way of the user interface.

10. The method of claim 9, further comprising updating, by the server, the weight of the link between each feature in the set of features and each psychometric feature of the plurality of test users to update the first predictor model and the second predictor model.

11. A system comprising:
a server that is configured to:
retrieve historical data of a plurality of test users, a first set of answers provided by each of the plurality of test users to a set of psychometric questions, and a plurality of test resumes of the plurality of test users, wherein each test resume of the plurality of test resumes includes first text data;
derive one or more psychometric features of each of the plurality of test users based on the first set of answers provided by each of the plurality of test users;
extract, from each of the plurality of test resumes a portion of the first text data that corresponds to a set of features, wherein the extracted portion of the first text data includes one or more first phrases and one or more first terms that are indicative of the set of features;
generate a first predictor model and a second predictor model based on the historical data of the plurality of test users, the one or more psychometric features of each of the plurality of test users, and the portion of the first text data extracted from each of the plurality of test resumes;
receive a target resume of a target user, wherein the target resume includes second text data;
extract a portion of the second text data that corresponds to the set of features from the target resume, wherein the extracted portion of the second text data includes one or more second phrases and one or more second terms that are indicative of the set of features;
predict one or more first psychometric features of the target user by using the extracted portion of the second text data as an input to the first prediction model;
predict one or more business outcomes for the target user based on the extracted portion of the second text data, the predicted one or more first psychometric features of the target user, and the second predictor model, wherein the one or more business outcomes include at least an employment affinity of the target user;
receive a feedback from a target user device of the target user on a relevance of the predicted one or more business outcomes; and
update the first predictor model and the second predictor model based on the received feedback to increase a prediction accuracy of the first predictor model and the second predictor model.

12. The system of claim 11, wherein the server is further configured to provide the extracted portion of the second text data as input to the second predictor model to predict the one or more business outcomes.

13. The system of claim 12, wherein the server is further configured to:

provide the predicted one or more first psychometric features of the target user as input to the second predictor model to predict the one or more business outcomes.

14. The system of claim 11, wherein the server is further configured to:
derive one or more second psychometric features of the target user based on a second set of answers provided by the target user to the set of psychometric questions; and
provide the derived one or more second psychometric features of the target user as input to the second predictor model to predict the one or more business outcomes.

15. The system of claim 11, wherein the server is further configured to:
map each feature in the set of features with each psychometric feature of each of the plurality of test users to generate a link therebetween; and
assign a weight to the link between each feature in the set of features and each psychometric feature of each of the plurality of test users to generate the first predictor model and the second predictor model.

16. The system of claim 15, wherein the server is further configured to:
render, on the target user device of the target user, a user interface for presenting the one or more business outcomes to the target user, wherein the feedback is provided to the user of the target user by way of the user interface.

17. The system of claim 16, wherein the server is further configured to update the weight of the link between each feature in the set of features and each psychometric feature of the plurality of test users to update the first predictor model and the second predictor model.

18. A non-transitory computer readable medium having stored thereon, computer executable instructions, which when executed by a computer, cause the computer to execute operations, the operations comprising:
retrieving historical data of a plurality of test users, a first set of answers provided by each of the plurality of test users to a set of psychometric questions, and a plurality of test resumes of the plurality of test users, wherein each test resume of the plurality of test resumes includes first text data;
deriving one or more psychometric features of each of the plurality of test users based on the first set of answers provided by each of the plurality of test users;
extracting, from each of the plurality of test resumes a portion of the first text data that corresponds to a set of features, wherein the extracted portion of the first text data includes one or more first phrases and one or more first terms that are indicative of the set of features;
generating a first predictor model and a second predictor model based on the historical data of the plurality of test users, the one or more psychometric features of each of the plurality of test users, and the portion of the first text data-extracted from each of the plurality of test resumes;
receiving a target resume of a target user, wherein the target resume includes second text data;
extracting a portion of the second text data corresponding to the set of features from the target resume, wherein the extracted portion of the second text data includes one or more second phrases and one or more second terms that are indicative of the set of features;
predicting one or more first psychometric features of the target user by using the extracted portion of the second text data as input to the first prediction model;
predicting one or more business outcomes for the target user based on the extracted portion of the second text data, the predicted one or more first psychometric features of the target user, and the second predictor model, wherein the one or more business outcomes include at least an employment affinity of the target user;
receiving a feedback from a target user device of the target user on a relevance of the predicted one or more business outcomes; and
updating, the first predictor model and the second predictor model based on the received feedback to increase a prediction accuracy of the first predictor model and the second predictor model.

19. The method of claim 1, further comprising converting, by the server, the retrieved historical data having a plurality of data formats to normalized historical data having a default format, wherein the default format is a textual format having one or more controllable fields, and wherein the normalized historical data is used for generating the first predictor model and the second predictor model.

20. The method of claim 1, further comprising tracking, by the server, activity logs of the plurality of test users on corresponding plurality of test user devices, wherein the activity logs indicate one or more activities of the plurality of test users on Internet and the corresponding plurality of test user devices, and wherein the historical data associated with the plurality of test users is retrieved based on the tracking of the activity logs of the plurality of test users.

* * * * *